(12) United States Patent
Satou

(10) Patent No.: US 12,157,224 B2
(45) Date of Patent: Dec. 3, 2024

(54) SPHERICAL SURFACE LINK MECHANISM, SPHERICAL SURFACE LINK ACTUATING DEVICE, LINK ACTUATING DEVICE, AND ORIGIN POSITIONING METHOD

(71) Applicant: NTN Corporation, Osaka (JP)

(72) Inventor: Naohiko Satou, Iwata (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 18/033,767

(22) PCT Filed: Oct. 26, 2021

(86) PCT No.: PCT/JP2021/039435
§ 371 (c)(1),
(2) Date: Apr. 25, 2023

(87) PCT Pub. No.: WO2022/092064
PCT Pub. Date: May 5, 2022

(65) Prior Publication Data
US 2023/0302628 A1    Sep. 28, 2023

(30) Foreign Application Priority Data

Oct. 28, 2020  (JP) .................. 2020-180482
Feb. 25, 2021  (JP) .................. 2021-028730

(51) Int. Cl.
*B25J 9/00*    (2006.01)
*B25J 11/00*   (2006.01)
(Continued)

(52) U.S. Cl.
CPC ............. *B25J 9/0048* (2013.01); *B25J 11/00* (2013.01); *F16H 21/48* (2013.01); *F16H 21/54* (2013.01)

(58) Field of Classification Search
CPC ......... B25J 9/0048; B25J 11/00; F16H 21/48; F16H 21/54
See application file for complete search history.

(56) References Cited

U.S. PATENT DOCUMENTS

| 2002/0066331 A1 | 6/2002 | Okada et al. |
| 2014/0223722 A1* | 8/2014 | Isobe ............... B23P 19/04 29/700 |

(Continued)

FOREIGN PATENT DOCUMENTS

| CN | 105773577 A | 7/2016 |
| CN | 105789892 A | 7/2016 |

(Continued)

OTHER PUBLICATIONS

International Search Report issued in International Application No. PCT/JP2021/039435 dated Dec. 14, 2021, with English translation.

*Primary Examiner* — Terence Boes
(74) *Attorney, Agent, or Firm* — Rimon P.C.

(57) ABSTRACT

A spherical surface link mechanism includes a proximal end link hub, a distal end link hub, a plurality of links, a plurality of intermediate link hubs, and a shaft member. Each of the plurality of links includes a first end link member, a second end link member, and an intermediate link member. The first end link member is coupled, at one end, to the proximal end link hub to be rotatable about a first rotation axis. The second end link member is coupled, at one end, to the distal end link hub to be rotatable about a second rotation axis. The intermediate link member is coupled, at one end, to the other end of the first end link member to be rotatable about a third rotation axis and is coupled to, at the other end, the other end of the second end link member to be rotatable about a fourth rotation axis.

19 Claims, 38 Drawing Sheets

(51) Int. Cl.
    *F16H 21/48*    (2006.01)
    *F16H 21/54*    (2006.01)

(56) References Cited

U.S. PATENT DOCUMENTS

2017/0014994 A1    1/2017    Isobe et al.
2021/0086350 A1    3/2021    Nose et al.

FOREIGN PATENT DOCUMENTS

| | | |
|---|---|---|
| EP | 2775168 B1 | 10/2017 |
| JP | H03-223687 A | 10/1991 |
| JP | 2001-353684 A | 12/2001 |
| JP | 2015-229198 A | 12/2015 |
| JP | 6289973 B2 | 3/2018 |
| JP | 2019-211048 A | 12/2019 |
| JP | 2020-153494 A | 9/2020 |

\* cited by examiner

SPHERICAL SURFACE LINK MECHANISM, SPHERICAL SURFACE LINK ACTUATING DEVICE, LINK ACTUATING DEVICE, AND ORIGIN POSITIONING METHOD

CROSS-REFERENCE OF RELATED APPLICATIONS

This application is the U.S. National Phase under 35 U.S.C. § 371 of International Patent Application No. PCT/JP2021/039435, filed on Oct. 26, 2021, which in turn claims the benefit of Japanese Patent Application No. 2020-180482, filed on Oct. 28, 2020, and Japanese Patent Application No. 2021-028730, filed Feb. 25, 2021, the entire disclosures of which Applications are incorporated by reference herein.

TECHNICAL FIELD

The present invention relates to a spherical surface link mechanism, a spherical surface link actuating device, a link actuating device, and an origin positioning method.

BACKGROUND ART

A parallel link mechanism is described in, for example, Patent Literature 1 (Japanese Patent No. 6289973). The parallel link mechanism described in Patent Literature 1 includes a proximal end link huh, a distal end link hub, and a plurality of link mechanisms.

Each of the plurality of link mechanisms includes a first end link member, a second end link member, and an intermediate link member. One end of the first end link member is rotatably coupled to the proximal end link hub. One end of the second end link member is rotatably coupled to the distal end link hub. One end and the other end of the intermediate link member are respectively rotatably coupled to the other end of the first link member and the other end of the second link member. The parallel link mechanism described in Patent Literature 1 is a spherical surface link mechanism. That is, the distal end link hub moves on a spherical surface centering on a spherical surface link center point.

CITATION LIST

Patent Literature

PTL 1: Japanese Patent No. 6289973

SUMMARY OF INVENTION

Technical Problem

In the parallel link mechanism described in Patent Literature 1, intermediate link members of the plurality of link mechanisms are not coupled to one another. Therefore, the parallel link mechanism described in Patent Literature 1 has room of improvement in rigidity.

The present invention has been devised in view of the problems of the related art described above. More specifically, the present invention provides a spherical surface link mechanism and a spherical surface actuating device having improved rigidity.

Solution to Problem

A spherical surface link mechanism of the present invention includes a proximal end link hub, a distal end link hub, a plurality of links, a plurality of intermediate link hubs, and a shaft member. Each of the plurality of links includes a first end link member, a second end link member, and an intermediate link member. The first end link member is coupled, at one end, to the proximal end link hub to be rotatable about a first rotation axis. The second end link member is coupled, at one end, to the distal end link hub to be rotatable about a second rotation axis. The intermediate link member is coupled, at one end, to another end of the first end link member to be rotatable about a third rotation axis and is coupled to, at another end, another end of the second end link member to be rotatable about a fourth rotation axis. A center axis of the proximal end link hub, the first rotation axis, and the third rotation axis cross at a first spherical surface link center point. A center axis of the distal end link hub, the second rotation axis, and the fourth rotation axis cross at a second spherical surface link center point. Each of the plurality of intermediate link hubs is connected to the intermediate link member of each of the plurality of links. The plurality of intermediate link hubs are coupled to one another by a shaft member to be rotatable about a fifth rotation axis that passes the first spherical surface link center point and the second spherical surface link center point.

The spherical surface link mechanism explained above may further include a bearing that reduces friction between at least one of the plurality of intermediate link hubs and the shaft member.

In the spherical surface link mechanism explained above, the bearing may be a rolling bearing. In the spherical surface link mechanism explained above, the bearing may be a slide bearing.

In the spherical surface link mechanism explained above, a through-hole piercing through the shaft member along the fifth rotation axis may be formed in the shaft member.

In the spherical surface link mechanism explained above, the shaft member may be formed integrally with one of the plurality of intermediate link hubs. In the spherical surface link mechanism explained above, the shaft member may be a member separate from the plurality of intermediate link hubs.

A spherical surface link actuating device of the present invention includes the spherical surface link mechanism and at least two or more driving sources. A position and a posture of at least one of the proximal end link hub and the distal end link hub are determined by the at least two or more driving sources.

In the spherical surface link actuating device explained above, each of the at least two or more driving sources may rotate the first end link member of each of the plurality of links about the first rotation axis.

In the spherical surface link actuating device explained above, each of the at least two or more driving sources may rotate each of the plurality of intermediate link hubs about the fifth rotation axis.

Advantageous Effect of Invention

With the spherical surface link mechanism and the spherical surface link actuating device of the present invention, it is possible to improve the rigidity of the spherical surface link mechanism.

DESCRIPTION OF EMBODIMENTS

Figure 1:
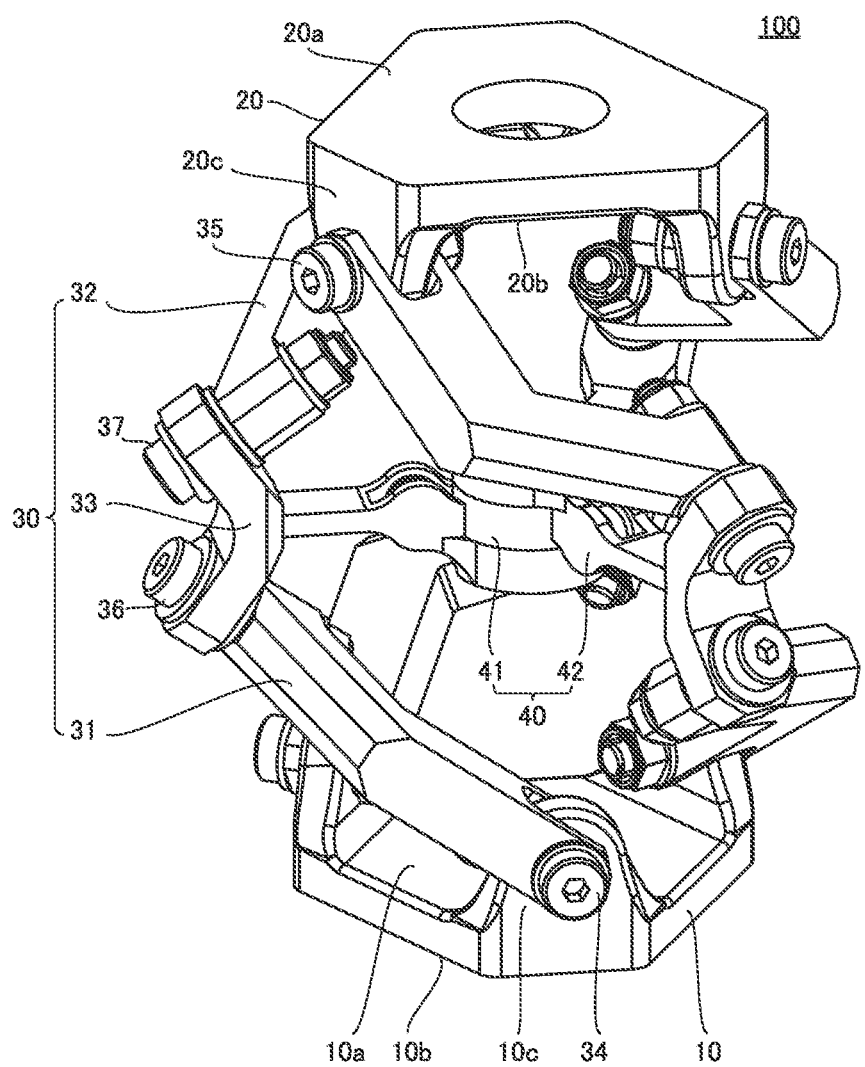
FIG. 1 is a perspective view of a spherical surface link mechanism 100.

Details of embodiments of the present invention are explained with reference to the drawings. in the drawings referred to below, the same or equivalent portions are denoted by the same reference numerals and signs and redundant explanation is not repeated.

First Embodiment

A spherical surface link mechanism (hereinafter "spherical surface link mechanism 100") according to a first embodiment is explained.

Configuration of a Spherical Surface Link Mechanism 100

A configuration of a spherical surface link mechanism 100 is explained below.

Figure 2:
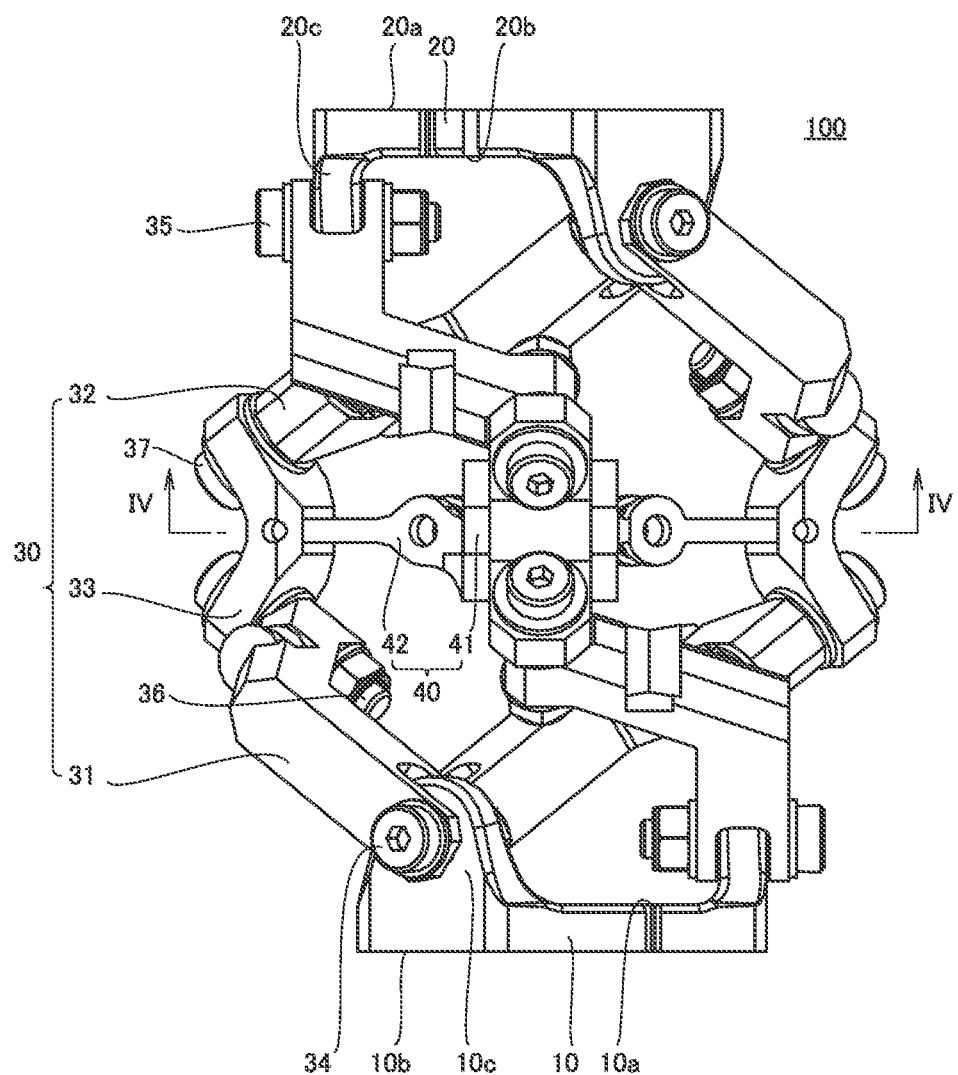
FIG. 2 is a front view of spherical surface link mechanism 100.
Figure 3:
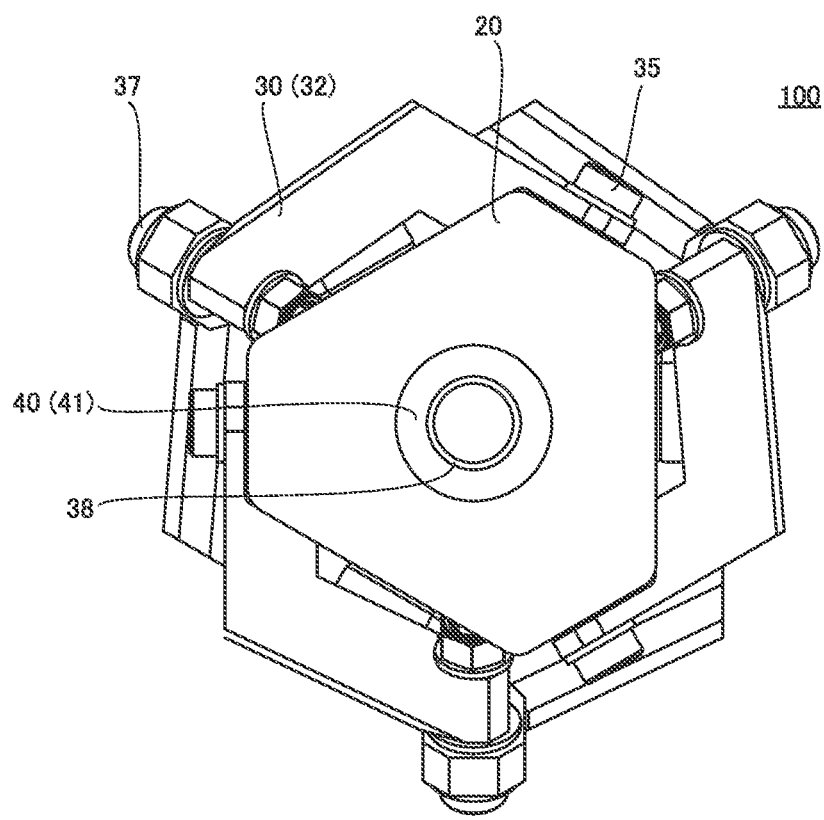
FIG. 3 is a plan view of spherical surface link mechanism 100.
Figure 4:
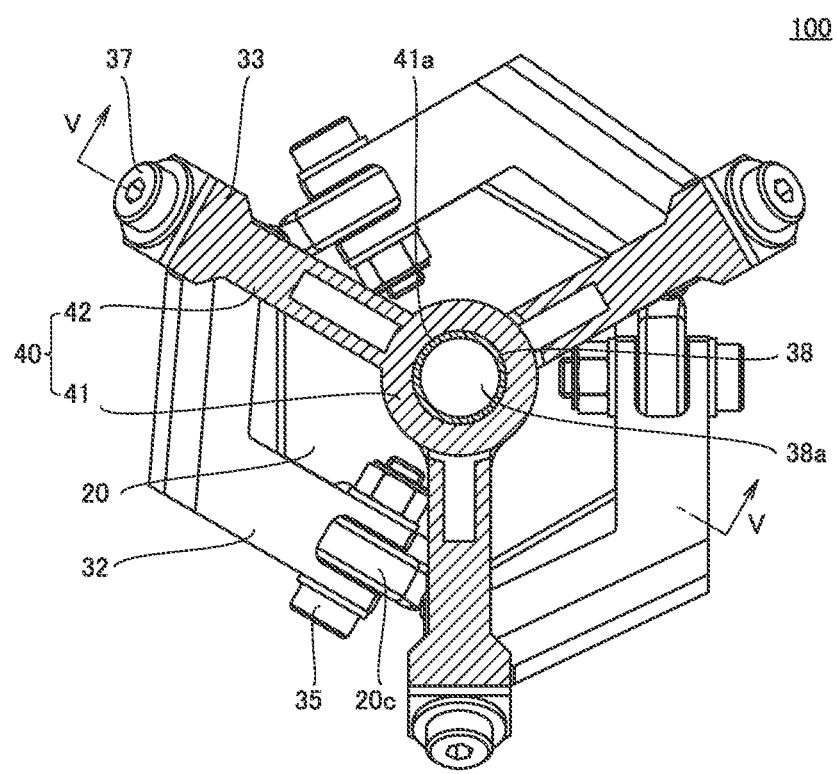
FIG. 4 is a sectional view in IV-IV in FIG. 2.
Figure 5:
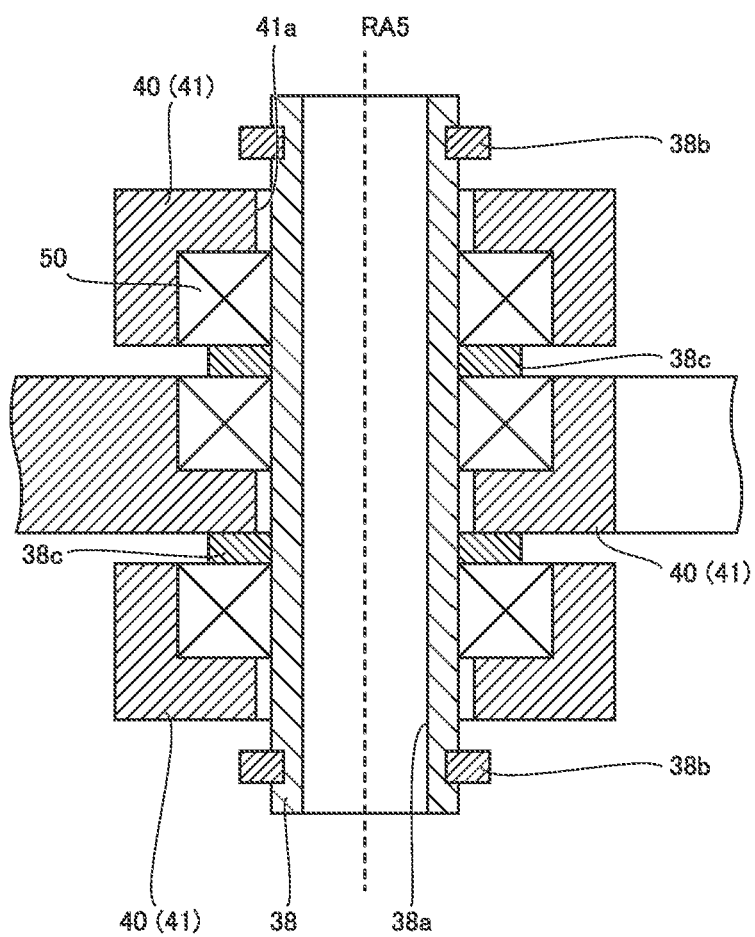
FIG. 5 is an enlarged sectional view in V-V in FIG. 4.

FIG. 1 is a perspective view of spherical surface link mechanism 100. FIG. 2 is a front view of spherical surface link mechanism 100. FIG. 3 is a plan view of spherical surface link mechanism 100. FIG. 4 is a sectional view in IV-IV in FIG. 2. FIG. 5 is an enlarged sectional view in V-V in FIG. 4.

As shown in FIG. 1, FIG. 2, FIG. 3, FIG. 4, and FIG. 5, spherical surface link mechanism 100 includes a proximal end link hub 10, a distal end link hub 20, a plurality of links 30, a plurality of intermediate link hubs 40, and bearings 50.

Proximal end link hub 10 has, for example, a plate-like shape. Proximal end link hub 10 includes a first surface 10a and a second surface 10b. Second surface 10b is the opposite surface of first surface 10a. A projecting section 10c is provided in proximal end link hub 10. Projecting section 10c is provided on first surface 10a. Projecting section 10c projects in a direction from second surface 10b to first surface 10a. A through-hole (not shown) is formed in projecting section 10c. In the following explanation, the center axis of proximal end link hub 10 is sometimes referred to as a center axis CL1.

Distal end link hub 20 has, for example, a plate-like shape. Distal end link hub 20 includes a first surface 20a and a second surface 20b. Second surface 20b is the opposite surface of first surface 20a and faces the first surface 10a side. A projecting section 20c is provided in distal end link hub 20. Projecting section 20c is provided on second surface 20b. Projecting section 20c projects in a direction from first surface 20a to second surface 20b. A through-hole (not shown) is formed in projecting section 20c. in the following explanation, the center axis of distal end link hub 20 is sometimes referred to as a center axis CL2. Although not shown, an end effector is attached to the first surface 20a side of distal end link hub 20.

Each of plurality of links 30 includes a first end link member 31, a second end link member 32, and an intermediate link member 33. The number of plurality of links 30 is, for example, three. However, the number of plurality of links 30 may be two or four or more. Plurality of links 30 preferably have the same shape.

First end link member 31 is rotatably coupled, at one end, to proximal end link hub 10. More specifically, a through-hole (not shown) is formed at one end of first end link member 31. A shaft member 34 is inserted through both of the through-hole formed at one end of first end link member 31 and the through-hole formed in projecting section 10c. Consequently, first end link member 31 is coupled, at one end, to proximal end link hub 10 to be rotatable about the center axis of shaft member 34 (hereinafter sometimes referred to as a first rotation axis RA1). First end link member 31 has, for example, an L shape.

Second end link member 32 is rotatably coupled, at one end, to distal end link hub 20. More specifically, a through-hole (not shown) is formed at one end of second end link member 32. A shaft member 35 is inserted through both of the through-hole formed at one end of second end link member 32 and through-hole formed in projecting section 20c. Consequently, second end link member 32 is coupled, at one end, to distal end link hub 20 to be rotatable about the center axis of shaft member 35 (hereinafter sometimes referred to as a second rotation axis RA2). Second end link member 32 has, for example, an L shape.

Intermediate link member 33 is rotatably coupled, at one end, to the other end of first end link member 31. More specifically, a through-hole (not shown) is formed at one end of intermediate link member 33. A through-hole (not shown) is formed at the other end of first end link member 31. A shaft member 36 is inserted through both of the through-hole formed at one end of intermediate link member 33 and the through-hole formed at the other end of first end link member 31.

Consequently, intermediate link member 33 is coupled, at one end, to the other end of first end link member 31 to be rotatable about the center axis of shaft member 36 (hereinafter sometimes referred to as a third rotation axis RA3).

Intermediate link member 33 is rotatably coupled, at the other end, to the other end of the second end link member 32. More specifically, a through-hole (not shown) is formed at the other end of intermediate link member 33. A through-hole (not shown) is formed at the other end of second end link member 32. A shaft member 37 is inserted through both of the through-hole formed at the other end of intermediate link member 33 and the through-hole formed at the other end of second end link member 32.

Consequently, intermediate link member 33 is coupled, at the other end, to the other end of second end link member 32 to be rotatable about the center axis of shaft member 37 (hereinafter sometimes referred to as a fourth rotation axis RA4).

Each of plurality of intermediate link hubs 40 includes a coupling section 41 and a beam section 42. A through-hole 41a is formed in coupling section 41. Beam section 42 is connected, at one end, to coupling section 41 and connected, at the other end, to intermediate link member 33. Coupling section 41 is located on the inner side of plurality of links 30. Intermediate link member 33 and intermediate link hubs 40 are, for example, one member.

Plurality of intermediate link hubs 40 are mutually rotatably coupled in coupling sections 41. More specifically, a shaft member 38 is inserted through through-hole 41a of each of plurality of intermediate link hubs 40. Consequently, plurality of intermediate link hubs 40 are coupled to one another to be rotatable about the center axis of shaft member 38 (hereinafter sometimes referred to as a fifth rotation axis RA5).

A through-hole 38a is formed in shaft member 38. Through-hole 38a pierces through shaft member 38 along fifth rotation axis RA5. From another viewpoint, shaft member 38 is a hollow member. However, shaft member 38 may be a solid member. Although not shown, a cable connected to the end effector attached to distal end link hub 20 is inserted through through-hole 38a.

Retaining rings 38b are attached to both the end portions of shaft member 38. Consequently, plurality of intermediate link hubs 40 (coupling sections 41) are prevented from coming off shaft member 38. Retaining rings 38b are, for example, C rings or E rings. Spacers 38c are attached to shaft member 38. Consequently, plurality of intermediate link hubs 40 (coupling sections 41) are separated from one another.

Bearings 50 are disposed on the inside of through-hole 41a. Consequently, friction between shaft member 38 and intermediate link hubs 40 (coupling sections 41) is reduced. Bearings 50 are not particularly limited if bearings 50 can reduce the friction between shaft member 38 and intermediate link hubs 40 (coupling sections 41).

Bearings 50 are, for example, rolling bearings or slide bearings. The rolling bearings are capable of supporting a radial load (a load in a direction orthogonal to fifth rotation axis RA5) and an axial load (a load in a direction parallel to fifth rotation axis RA5). Note that bearings 50 only have to be provided between at least one of plurality of intermediate link hubs 40 and shaft member 38.

Figure 6:
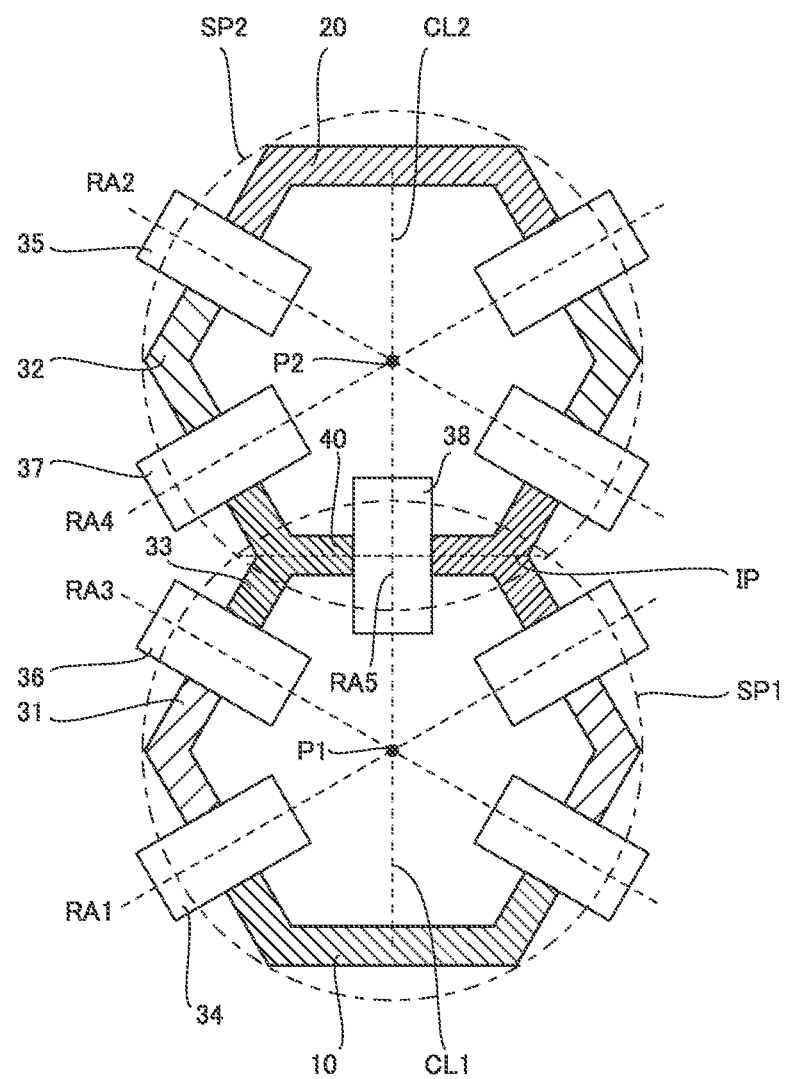
FIG. 6 is a schematic diagram showing a mutual relation between a center axis CL1 and a center axis CL2 and a first rotation axis RA1 to a fifth rotation axis RA5.

FIG. 6 is a schematic diagram showing a mutual relation between center axis CL1 and center axis CL2 and first rotation axis RA1 to fifth rotation axis RA5. As shown in FIG. 6, center axis CL1, first rotation axis RA1, and third rotation axis RA3 cross at one point. This one point is referred to as a spherical surface link center point P1. Center axis CL2, second rotation axis RA2, and fourth rotation axis RA4 cross at one point. This one point is referred to as a spherical surface link center point P2.

A spherical surface centering on spherical surface link center point P1 is referred to as a moving spherical surface SP1. Proximal end link hub 10 moves on moving spherical surface SP1. A spherical surface centering on spherical surface link center point P2 is referred to as a moving spherical surface SP2. Distal end link hub moves on moving spherical surface SP2. That is, spherical surface link mechanism 100 has structure in which two spherical surface link mechanisms are combined.

Fifth rotation axis RA5 passes both of spherical surface link center point P1 and spherical surface link center point P2. From another viewpoint, fifth rotation axis RA5 passes the center of a surface (an intermediate plane IP having a circular shape) where moving spherical surface SP1 and moving spherical surface SP1 cross and is orthogonal to intermediate plane IP. The relation explained above always holds irrespective of the positions and the postures of proximal end link hub 10 and distal end link hub 20.

Effects of Spherical Surface Link Mechanism 100

Effects of spherical surface link mechanism 100 are explained below in comparison with a spherical surface link mechanism according to a comparative example.

A configuration of the spherical surface link mechanism according to the comparative example is the same as the configuration of spherical surface link mechanism 100 except that the spherical surface link mechanism according to the comparative example does not include intermediate link hubs 40.

In spherical surface link mechanism 100, intermediate link members 33 of plurality of links 30 are mutually rotatably coupled by plurality of intermediate link hubs 40. However, fifth rotation axis RA5 passes spherical surface link center point P1 and spherical surface link center point P2. Therefore, with spherical surface link mechanism 100, it is possible to move proximal end link hub 10 and distal end link hub 20 as in the spherical surface link mechanism according to the comparative example.

In the spherical surface link mechanism according to the comparative example, intermediate link members 33 of plurality of links 30 are not coupled to one another. Therefore, in the spherical surface link mechanism according to the comparative example, in order to improve rigidity, it is necessary to improve the rigidity of the link members (first end link member 31, second end link member 32, and intermediate link member 33) and the coupling sections among the link members. However, there is a limitation in the volume of the link members and the coupling sections among the link members in order to avoid interference among plurality of links 30. Therefore, there is a limitation in the rigidity improvement.

On the other hand, in spherical surface link mechanism 100, plurality of links 30 are coupled to one another by intermediate link hubs 40. In spherical surface link mechanism 100, rigidity is improved by coupling plurality of intermediate link hubs 40 to one another. Therefore, the rigidity improvement is less easily affected by the volume of die link members and the coupling sections among the link members. In this way, with spherical surface link mechanism 100, it is possible to improve the rigidity without compromising the operation of the spherical surface link mechanism.

Note that, since the rigidity of spherical surface link mechanism 100 is improved, positioning accuracy of distal end link hub 20 (proximal end link hub 10) is improved and the operation of spherical surface link mechanism 100 becomes smooth.

In the spherical surface link mechanism according to the comparative example, a region into which link 30 does not intrude is present on the inside. For example, the cable connected to the end effector can be inserted through the region. However, this region cannot be viewed in the spherical surface link mechanism according to the comparative example. On the other hand, in spherical surface link mechanism 100, plurality of intermediate link hubs 40 coupled to one another are located in a region into which link 30 does not intrude. Therefore, with spherical surface link mechanism 100, it is easy to recognize the region into which link 30 does not intrude present on the inside.

In spherical surface link mechanism 100, since the cable can be inserted through through-hole 38a, it is possible to protect the cable. As a result of the cable being inserted through through-hole 38a, deflection of the cable is suppressed and interference between the cable and link 30 is suppressed. Since through-hole 38a is formed in shaft member 38, it is possible to reduce shaft member 38 in weight.

In spherical surface link mechanism 100, since shaft member 38 is a member separate from intermediate link hubs 40, it is possible to simplify structure for coupling plurality of intermediate link hubs 40 one another. Eventually, it is possible to reduce manufacturing cost of spherical surface link mechanism 100. Since shaft member 38 follows movement of the cable when the cable is inserted through through-hole 38a, a load on the cable and friction with the cable decrease.

In spherical surface link mechanism 100, since the friction between intermediate link hubs 40 and shaft member 38 is reduced by bearings 50, the life of spherical surface link mechanism 100 is improved. Heat generation from spherical surface link mechanism 100 during operation can be suppressed by this friction reduction.

If the volume of the coupling sections of the link members is increased, interference sometimes occurs among plurality of links 30. However, interference less easily occurs even if the volume of the coupling sections of plurality of intermediate link hubs 40 is increased. Therefore, bearings larger than bearings used in the coupling sections of the link members can be used as bearings 50. As a result, it is possible to further improve the rigidity of spherical surface link mechanism 100.

When bearings 50 are rolling bearings, bearings 50 can support an axial load in addition to a radial load. When bearings 50 are slide bearings, bearings 50 can be reduced in weight and vibration is less easily transmitted between shaft member 38 and intermediate link hubs 40.

Experiment Example

A simulation for applying a load of 100 N between proximal end link hub 10 and distal end link hub 20 in a state in which proximal end link hub 10 and distal end link hub 20 are opposed and calculating stress and displacement in the members of the spherical surface link mechanism was implemented using a finite element analysis method. Note that, in this simulation, the members constituting the spherical surface link mechanism according to the comparative example and spherical surface link mechanism 100 were formed by steel.

According to a result of the simulation explained above, in the spherical surface link mechanism according to the comparative example, distal end link hub 20 was displaced 0.148 mm toward the proximal end link hub 10 side. On the other hand, in spherical surface link mechanism 100, distal end link hub 20 was displaced 0.059 mm toward proximal end link hub 10. In this way, a displacement amount of distal end link hub 20 in spherical surface link mechanism 100 was less than 50 percent of a displacement amount of distal end link hub 20 in the spherical surface link mechanism according to the comparative example.

In the simulation explained above, a safety factor a value obtained by dividing yield stress of a material constituting the members constituting the spherical surface link mechanism by maximum stress applied to the members) of the spherical surface link mechanism according to the comparative example was 6.723. On the other hand, a safety factor of spherical surface link mechanism 100 was 8.763. In this way, with spherical surface link mechanism 100, it has been clarified in the simulation that the displacement of distal end link hub 20 is suppressed and the load of distal end link hub 20 is dispersed and the safety factor increases, that is, the rigidity is improved.

Second Embodiment

A spherical surface link mechanism according to a second embodiment (hereinafter, "spherical surface link mechanism 200") is explained. Here, differences from spherical surface link mechanism 100 are mainly explained and redundant explanation is not repeated.

Configuration of Spherical Surface Link Mechanism 200

A configuration of spherical surface link mechanism 200 is explained below.

Spherical surface link mechanism 200 includes proximal end link hub 10, distal end link hub 20, plurality of links 30, plurality of intermediate link hubs 40, and bearings 50. In this regard, the configuration of spherical surface link mechanism 200 is common to the configuration of spherical surface link mechanism 100.

Figure 7:
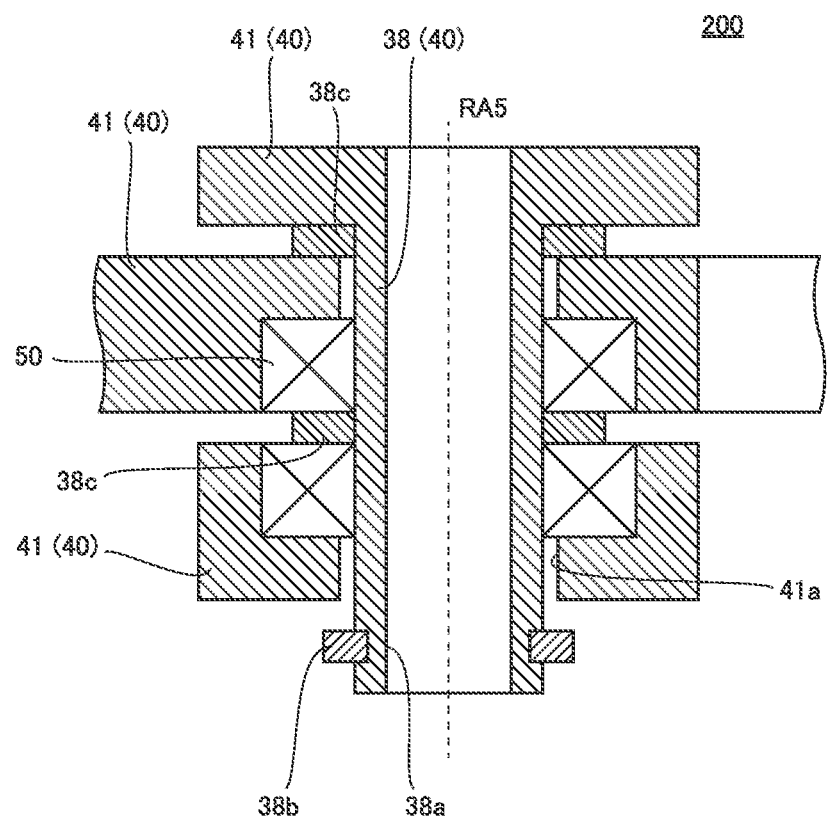
FIG. 7 is an enlarged sectional view of a spherical surface link mechanism 200.

FIG. 7 is an enlarged sectional view of spherical surface link mechanism 200. In FIG. 7, an enlarged sectional view of spherical surface link mechanism 200 in a position corresponding to FIG. 5 is shown. As shown in FIG. 7, in spherical surface link mechanism 200, shaft member 38 is formed integrally with one of plurality of intermediate link hubs 40 (shaft member 38 is a part of one of plurality of intermediate link hubs 40). In this regard, the configuration of spherical surface link mechanism 200 is different from the configuration of spherical surface link mechanism 100.

Effects of Spherical Surface Link Mechanism 200

Effects of spherical surface link mechanism 200 are explained below.

In spherical surface link mechanism 200, since shaft member 38 is formed integrally with one of plurality of intermediate link hubs 40, it is possible to reduce the number of bearings 50. More specifically, in spherical surface link mechanism 100, since shaft member 38 is the member separate from intermediate link hubs 40, three bearings 50 in total are necessary. On the other hand, in spherical surface link mechanism 200, since shaft member 38 is formed integrally with one of plurality of intermediate link hubs 40, two number of bearings 50 are enough. In this way, with spherical surface link mechanism 200, it is possible to reduce the number of bearings 50. Therefore, it is possible to reduce manufacturing cost.

Third Embodiment

A spherical surface link mechanism according to a third embodiment (hereinafter, "spherical surface link mechanism 300") is explained. Here, differences from spherical surface link mechanism 100 are mainly explained and redundant explanation is not repeated.

Configuration of Spherical Surface Link Mechanism 300

A configuration of spherical surface link mechanism 300 is explained below.

Figure 8:
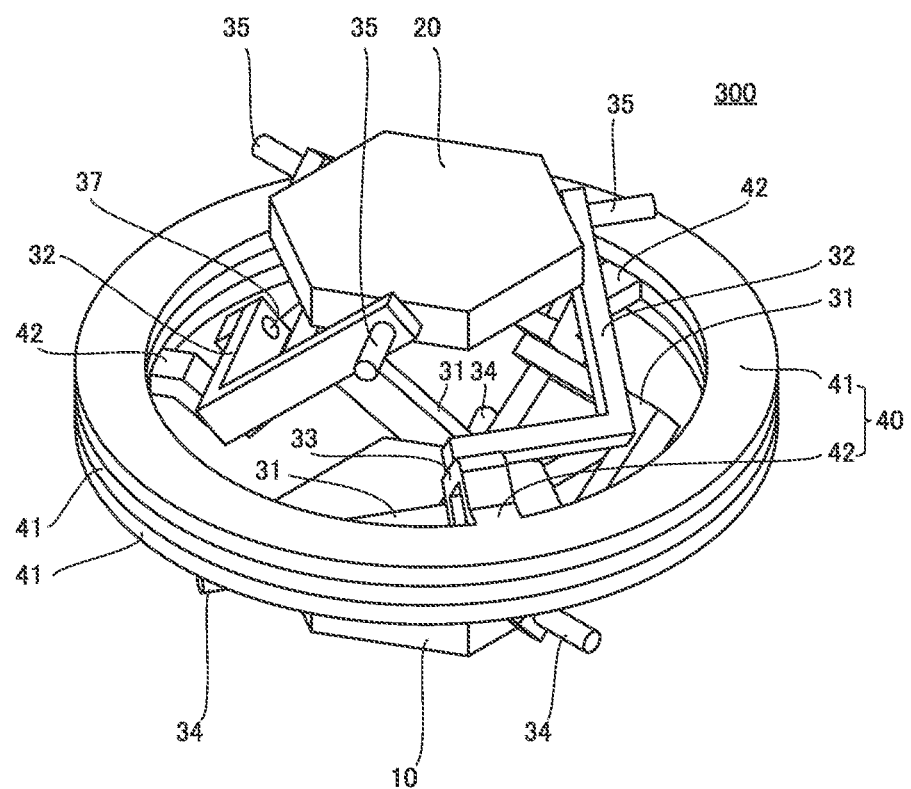
FIG. 8 is a perspective view of a spherical surface link mechanism 300.

Spherical surface link mechanism 300 includes proximal end link hub 10, distal end link hub 20, plurality of links 30, plurality of intermediate link hubs 40, and bearings 50 (not shown in FIG. 8). In this regard, the configuration of spherical surface link mechanism 300 is common to the configuration of spherical surface link mechanism 100.

FIG. 8 is a perspective view of spherical surface link mechanism 300. As shown in FIG. 8, in spherical surface link mechanism 300, coupling sections 41 are located on the outer side of plurality of links 30. In this regard, the configuration of spherical surface link mechanism 300 is different from the configuration of spherical surface link mechanism 100.

Figure 9:
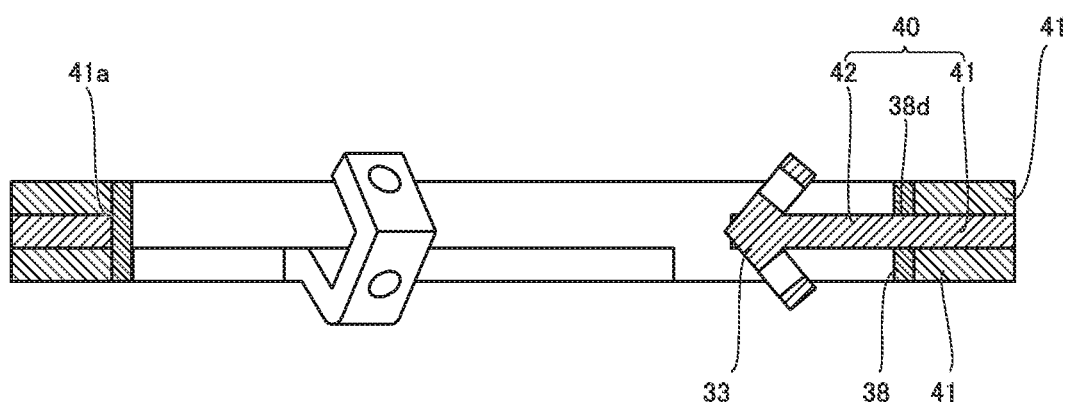
FIG. 9 is an enlarged sectional view of spherical surface link mechanism 300.

FIG. 9 is an enlarged sectional view of spherical surface link mechanism 300. In FIG. 9, illustration of the components other than intermediate link member 33, shaft member 38, and intermediate link hubs 40 is omitted. As shown in FIG. 9, in spherical surface link mechanism 300, shaft member 38 is inserted through through-hole 41a, whereby coupling sections 41 of plurality of intermediate link hubs 40 are coupled to be rotatable about fifth rotation axis RA5. However, in spherical surface link mechanism 300, a through-hole 38d for inserting through beam section 42 is formed in shaft member 38.

Figure 10:
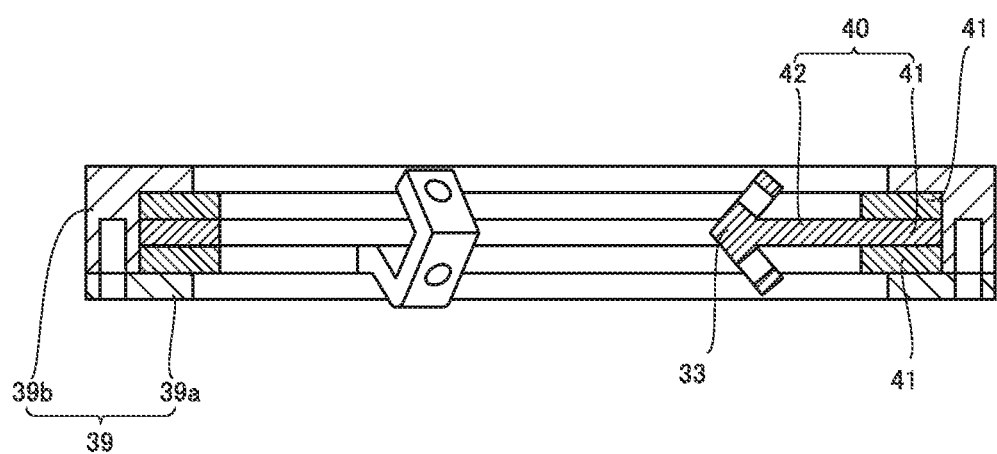
FIG. 10 is an enlarged sectional view of spherical surface link mechanism 300 according to a first modification.

FIG. 10 is an enlarged sectional view of spherical surface link mechanism 300 according to a first modification. In FIG. 10, illustration of the components other than intermediate link members 33, an outer ring 39, and intermediate link hubs 40 is omitted. As shown in FIG. 10, spherical surface link mechanism 300 may include outer ring 39 instead of shaft member 38. Outer ring 39 is disposed on the outer side of coupling section 41 of each of plurality of intermediate link hubs 40 and holds coupling section 41 of each of plurality of intermediate link hubs 40 to be rotatable about fifth rotation axis RA5. More specifically, outer ring 39 includes a first member 39a and a second member 39b. First member 39a and second member 39b are coupled to each other in a state in which coupling section 41 of each of plurality of intermediate link hubs 40 is sandwiched between first member 39a and second member 39b.

Figure 11:
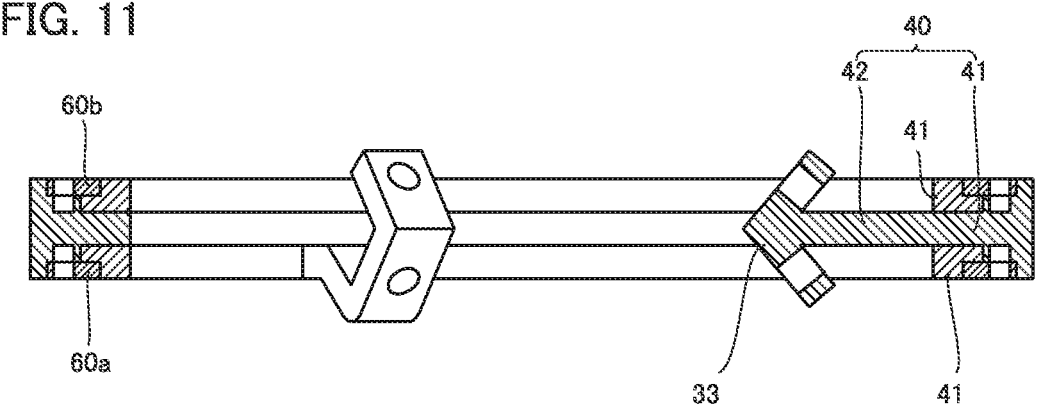
FIG. 11 is an enlarged sectional view of spherical surface link mechanism 300 according to a second modification.

FIG. 11 is an enlarged sectional view of spherical surface link mechanism 300 according to a second modification. In FIG. 11, illustration of the components other than intermediate link members 33, a falling-off preventing ring 60a, a falling-off preventing ring 60b, and intermediate link hubs 40 is omitted. As shown in FIG. 11, spherical surface link mechanism 300 may include falling-off preventing ring 60a and falling-off preventing ring 60b instead of outer ring 39.

Coupling section 41 of one intermediate link hub 40 is sandwiched by coupling sections 41 of other two intermediate link hubs 40. Falling-off preventing ring 60a and falling-off preventing ring 60b are attached to coupling section 41 of one intermediate link hub 40. Falling-off preventing ring 60a and falling-off preventing ring 60b sandwich coupling section 41 of each of plurality of intermediate link hubs 40. Consequently, coupling section 41 of each of plurality of intermediate link hubs 40 is held to be rotatable about fifth rotation axis RA5.

Effects of Spherical Surface Link Mechanism 300

In spherical surface link mechanism 100 and spherical surface link mechanism 300, by rotating each of plurality of intermediate link hubs 40 about fifth rotation axis RA5 with a driving source (not shown), it is possible to respectively symmetrically move proximal end link hub 10 and distal end link hub 20 with respect to intermediate plane IP.

However, in spherical surface link mechanism 100, since plurality of intermediate link hubs 40 are present on the inner side of plurality of links 30, it is difficult to install driving sources for driving plurality of intermediate link hubs 40. On the other hand, in spherical surface link mechanism 300, since plurality of intermediate link hubs 40 are present on the outer side of plurality of links 30, it is easy to install the driving sources for driving plurality of intermediate link hubs 40.

Fourth Embodiment

A spherical surface link actuating device according to a fourth embodiment (hereinafter, "spherical surface link actuating device 400") is explained.

Figure 12:
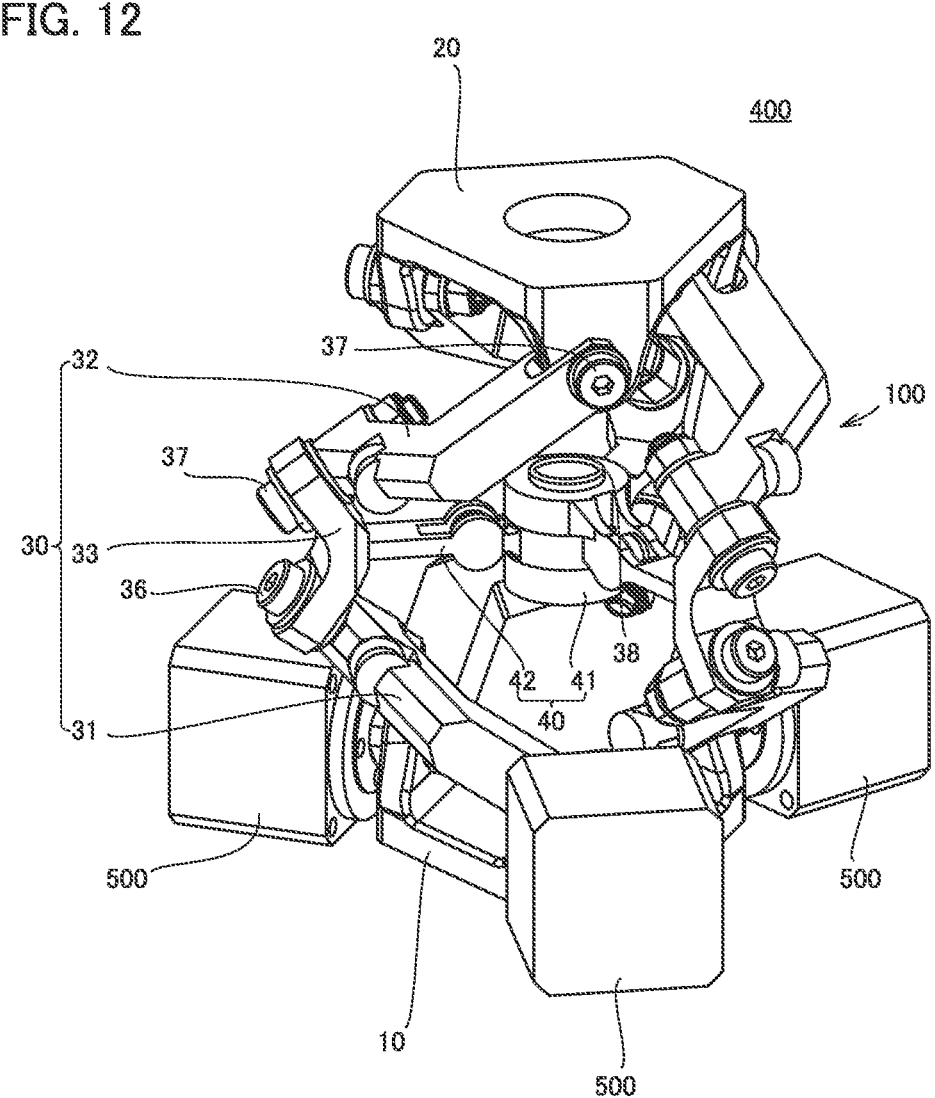
FIG. 12 is a perspective view of a spherical surface link actuating device 400.

FIG. 12 is a perspective view of spherical surface link actuating device 400. As shown in FIG. 12, spherical surface link actuating device 400 includes spherical surface link mechanism 100 and a plurality of driving sources 500. The number of plurality of driving sources 500 is two or more. When the number of plurality of links 30 included in spherical surface link mechanism 100 is three or more, the number of plurality of driving sources 500 may be smaller than the number of plurality of links 30.

Driving source 500 is, for example, a motor. Plurality of driving sources 500 are attached to spherical surface link mechanism 100. Each of plurality of driving sources 500 rotates first end link member 31 of each of plurality of links 30 about first rotation axis RA1. Consequently, it is possible to change the position and the posture of distal end link hub 20 with respect to proximal end link hub 10. Although not shown, each of plurality of driving sources 500 may rotate second end link member 32 of each of plurality of links 30 about second rotation axis RA2. Consequently, it is possible to change the position and the posture of proximal end link hub 10 with respect to distal end link hub 20.

In spherical surface link actuating device 400, spherical surface link mechanism 200 may be used instead of spherical surface link mechanism 100. In spherical surface link actuating device 400, spherical surface link mechanism 300 may be used instead of spherical surface link mechanism 100. Although not shown, when spherical surface link mechanism 300 is used in spherical surface link actuating device 400, each of plurality of driving sources 500 can respectively symmetrically move proximal end link hub 10 and distal end link hub 20 with respect to intermediate plane IP by rotating each of plurality of intermediate link hubs 40 about fifth rotation axis RA5.

In spherical surface link actuating device 400, when each of plurality of driving sources 500 rotates first end link member 31 of each of plurality of links 30 about first rotation axis RA1 to thereby change the position and the posture of distal end link hub 20 with respect to proximal end link hub 10, it is possible to reduce an inertial moment involved in the movement of distal end link hub 20.

On the other hand, in spherical surface link actuating device 400, when each of plurality of driving sources 500 rotates each of plurality of intermediate link hubs 40 about fifth rotation axis RA5 to thereby change the position and the posture of distal end link hub 20 with respect to proximal end link hub 10, since proximal end link hub 10 and distal end link hub 20 are symmetrically moved, it is possible to reduce accumulation of errors such as backlash.

Fifth Embodiment

A link actuating device according to a fifth embodiment (hereinafter referred to as "link actuating device 600") is explained.

Schematic Configuration of Link Actuating Device 600

Figure 13:
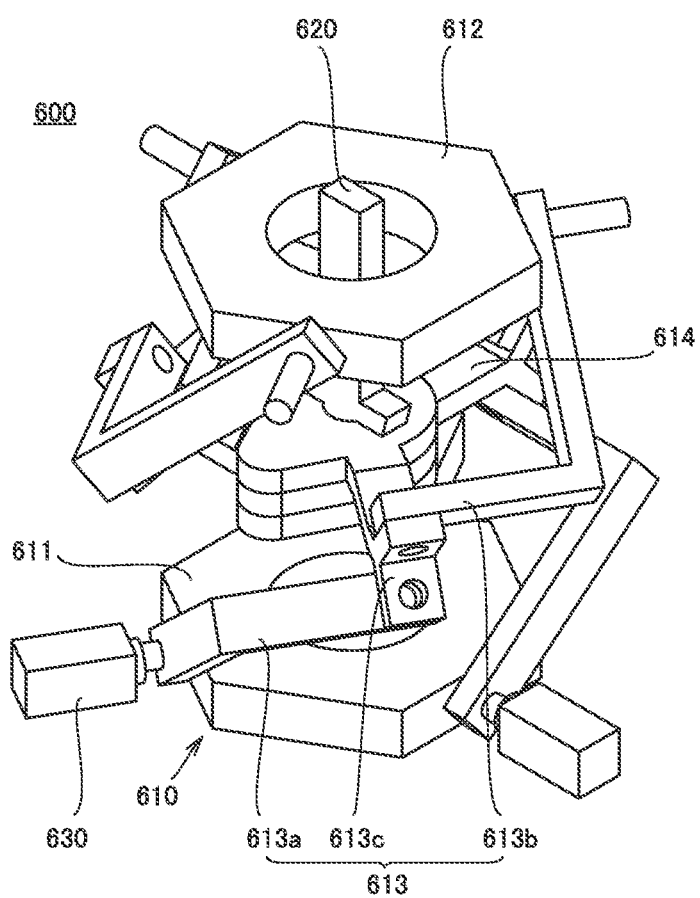
FIG. 13 is a perspective view of a link actuating device 600.
Figure 14:
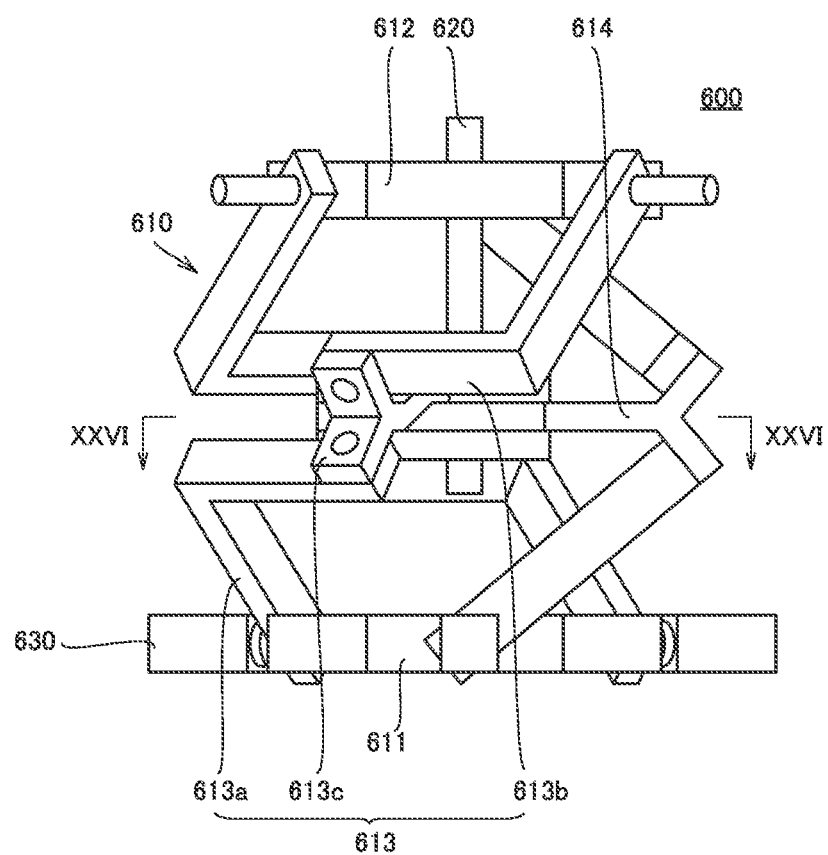
FIG. 14 is a front view of link actuating device 600.
Figure 15:
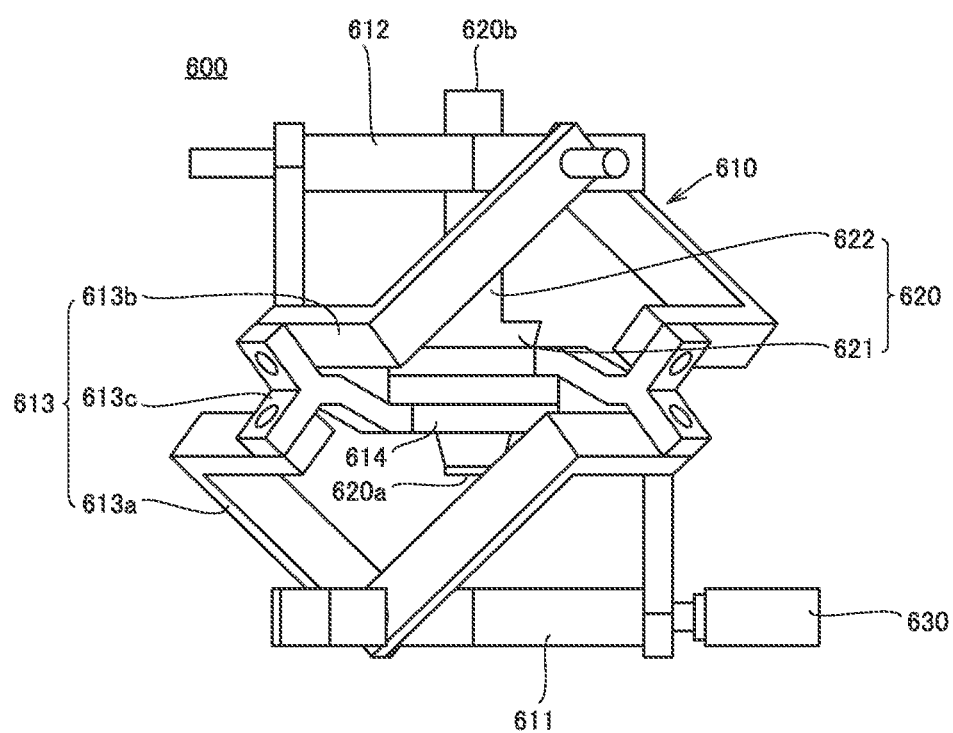
FIG. 15 is a side view of link actuating device 600.
Figure 16:
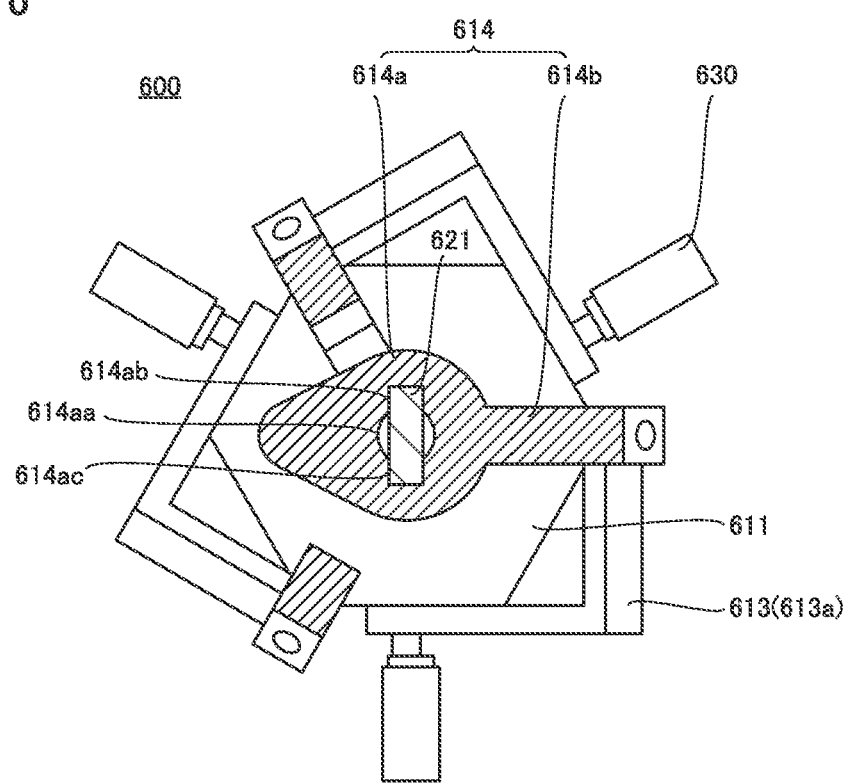
FIG. 16 is a sectional view in XVI-XVI in FIG. 15.
Figure 17:
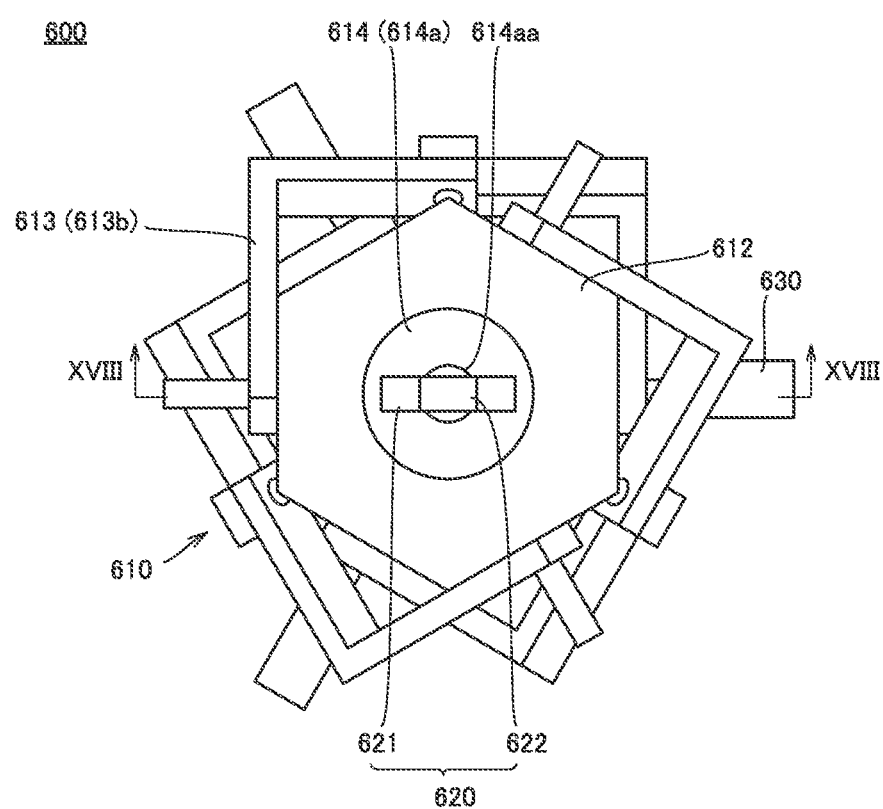
FIG. 17 is a plan view of link actuating device 600.
Figure 18:
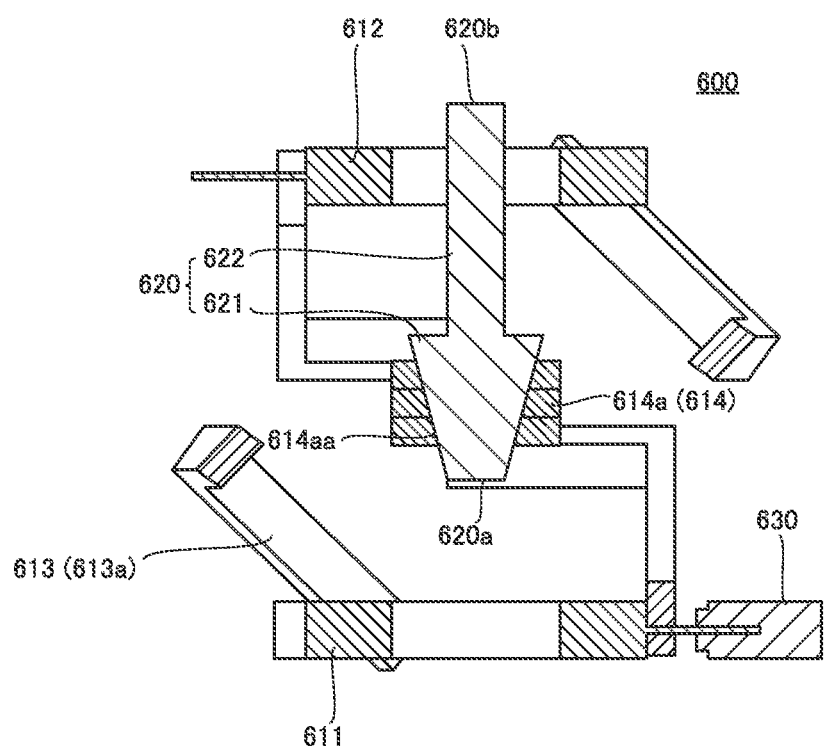
FIG. 18 is a sectional view in XVIII-XVIII in FIG. 17.

FIG. 13 is a perspective view of link actuating device 600. FIG. 14 is a front view of link actuating device 600. FIG. 15 is a side view of link actuating device 600. FIG. 16 is a sectional view in XVI-XVI in FIG. 15. FIG. 17 is a plan view of link actuating device 600. FIG. 18 is a sectional view in XVIII-XVIII in FIG. 17. As shown in FIG. 13 to FIG. 18, link actuating device 600 includes a spherical surface link mechanism 610, an origin positioning member 620, and a driving source 630.

Detailed Configuration of Spherical Surface Link Mechanism 610

Spherical surface link mechanism 610 includes a proximal end link hub 611, a distal end link hub 612, a plurality of links 613, and a plurality of intermediate link hubs 614.

Proximal end link hub 611 and distal end link hub 612 are, for example, flat However, the shape of proximal end link hub 611 and distal end link hub 612 is not limited to this. In the following explanation, the center axis of proximal end link hub 611 is referred to as a first center axis and the center axis of distal end link hub 612 is referred to as a second center axis. Although not shown, an end effector is attached to, for example, distal end link hub 612.

The number of plurality of links 613 is, for example, three. However, the number of plurality of links 613 may be four or more. Plurality of links 613 are disposed, for example, at equal intervals, in a direction along a circumference centering on the first center axis. Link 613 includes a first end link member 613a, a second end link member 613b, and an intermediate link member 613c.

First end link member 613a is coupled, at one end of first end link member 613a, to proximal end link hub 611 to he rotatable about a first rotation axis. Second end link member 613b is coupled, at one end of second end link member 613b, to distal end link hub 612 to be rotatable about a second rotation axis. First end link member 613a and second end link member 613b are, for example, L-shaped.

Intermediate link member 613c is coupled, at one end of intermediate link member 613c, to the other end of first end link member 613a to be rotatable about a third rotation axis. Intermediate link member 613c is coupled, at the other end of intermediate link member 613c, to the other end of second end link member 613b to be rotatable about a fourth rotation axis. Intermediate link member 613e has, for example, an L shape.

The first rotation axis, the third rotation axis, and the first center axis cross at a first spherical surface link center point. The second rotation axis, the fourth rotation axis, and the second center axis cross at a second spherical surface link center point. Therefore, proximal end link hub 611 moves on a spherical surface (a first moving spherical surface) centering on the first spherical surface link center point and distal end link hub 612 moves on a spherical surface (a second moving spherical surface) centering on the second spherical surface link center point. That is, spherical surface link mechanism 610 has structure in which two spherical surface link mechanisms are combined.

The number of plurality of intermediate link hubs 614 is equal to the number of plurality of links 613. Intermediate link huh 614 includes a coupling section 614a and a beam section 614b. Coupling section 614a is disposed on the inner side of plurality of links 613.

Coupling sections 614a of plurality of intermediate link hubs 614 are coupled to one another to be rotatable about a fifth rotation axis. The fifth rotation axis passes both of the first spherical surface link center point and the second spherical surface link center point. From another viewpoint, the fifth rotation axis passes the center of a surface (an intermediate plane having a circular shape) where the first moving spherical surface and the second moving spherical surface cross and is orthogonal to the intermediate plane. This always holds irrespective of the positions and the postures of proximal end link hub 611 and distal end link hub 612. Therefore, spherical surface link mechanism 610 is capable of performing the same operation as an operation performed when spherical surface link mechanism 610 does not include plurality of intermediate link hubs 614.

A first through-hole 614aa is formed in coupling section 614a. First through-hole 614aa pierces through coupling section 614a in the direction of the fifth rotation axis. First through-holes 614aa of plurality of intermediate link hubs 614 overlap one another.

A first groove 614ab and a second groove 614ac are formed on the inner wall surface of first through-hole 614aa. First groove 614ab and second groove 614ac extend from the inner wall surface of first through-hole 614aa toward the radial direction outer side of first through-hole 614aa. First groove 614ab and second groove 614ac are present in positions symmetrical with respect to the center of first through-hole 614aa.

First groove 614*ab* and second groove 614*ac* of each of plurality of intermediate link hubs 614 are formed to overlap each other when distal end link hub 612 is present in an origin position. Distal end link hub 612 is present in the origin position when the second center axis is present on the same straight line as the first center axis (when a bending angle of spherical surface link mechanism 610 is 0°).

Beam section 614*b* is connected, at one end of beam section 614*b*, to coupling section 614*a*. Beam section 614*b* is connected, at the other end of beam section 614*b*, to intermediate link member 613*c*. Intermediate link hub 614 (coupling section 614*a* and beam section 614*b*) may be formed integrally with intermediate link member 613*c*.

Detailed Configuration of Origin Positioning Member 620

Origin positioning member 620 is plate-like. Origin positioning member 620 includes a first end 620*a* and a second end 620*b*. First end 620*a* and second end 620*b* are ends in the longitudinal direction of origin positioning member 620. Second end 620*b* is an end on the opposite side of first end 620*a*.

Origin positioning member 620 includes a first portion 621 and a second portion 622. First portion 621 is a portion on the first end 620*a* side of origin positioning member 620. Second portion 622 is a portion on the second end 620*b* side of origin positioning member 620. The width of first portion 621 in a direction orthogonal to the longitudinal direction of origin positioning member 620 is larger than the width of second portion 622 in the direction orthogonal to the longitudinal direction of origin positioning member 620. The width of first portion 621 in the direction orthogonal to the longitudinal direction of origin positioning member 620 decreases toward first end 620*a*.

Origin positioning member 620 is inserted into first through-hole 614*aa* (more specifically, first groove 614*ab* and second groove 614*ac*) of each of intermediate link hubs 614 when distal end link hub 612 is present in the origin position, whereby plurality of intermediate link hubs 614 become incapable of mutually rotating about the fifth rotation axis.

When plurality of intermediate link hubs 614 become incapable of mutually rotating about the fifth rotation axis, the positions and the postures of proximal end link hub 611, distal end link hub 612, and plurality of links 613 are fixed, whereby distal end link hub 612 is fixed to the origin position. Note that it is sufficient that origin positioning member 620 disables at least two or more among plurality of intermediate link hubs 614 to rotate about the fifth rotation axis.

Detailed Configuration of Driving Source 630

Driving source 630 is, for example, a motor. The number of plurality of driving sources 630 is equal to, for example, the number of plurality of links 613. However, the number of plurality of driving sources 630 may be smaller than the number of plurality of links 613 if the number of plurality of driving sources 630 is two or more. Each of plurality of driving sources 630 rotates first end link member 613*a* of each of plurality of links 613 about the first rotation axis. The position and the posture of distal end link hub 612 are changed by changing an amount of the rotation.

Origin Positioning Method in Link Actuating Device 600

Figure 19:
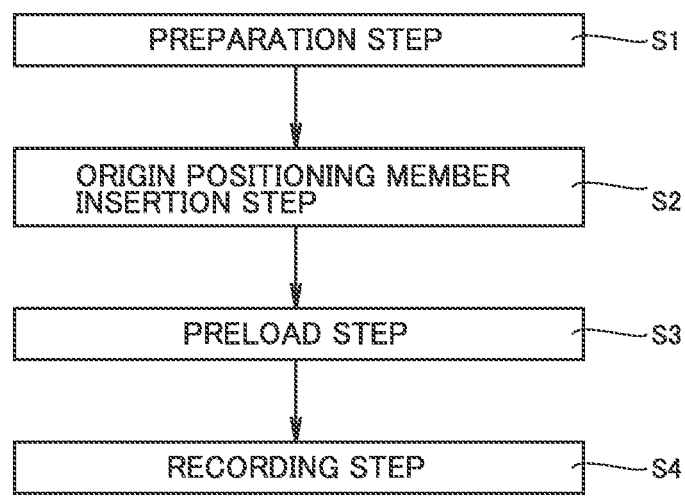
FIG. 19 is a flowchart showing an origin positioning method in link actuating device 600.

FIG. 19 is a flowchart showing an origin positioning method in link actuating device 600. As shown in FIG. 19, the origin positioning method in link actuating device 600 includes a preparation step S1, an origin positioning member insertion step S2, a preload step S3, and a recording step S4. Origin positioning member insertion step S2 is performed after preparation step S1. Preload step S3 is performed after origin positioning member insertion step S2. Recording step S4 is performed after preload step S3.

In preparation step S1, link actuating device 600 is prepared. In origin positioning member insertion step S2, first, driving source 630 adjusts an amount of rotating first end link member 613*a* about the first rotation axis to thereby move distal end link hub 612 to the origin position. In origin positioning member insertion step S2, secondly, origin positioning member 620 is inserted into first through-hole 614*aa* (first groove 614*ab* and second groove 614*ac*) of each of plurality of intermediate link hubs 614. Consequently, origin positioning member 620 becomes incapable of rotating about the fifth rotation axis of plurality of intermediate link hubs 614. Distal end link hub 612 is fixed to the origin position.

In preload step S3, each of plurality of driving sources 630 generates torque for rotating first end link member 613*a* of each of plurality of links 613 about the first rotation axis, whereby preload is applied on each of plurality of links 613. In recording step S4, torque of each of plurality of driving sources 630 in a state in which the preload explained above is applied is recorded or output.

In recording step S4, an operation amount of each of plurality of driving sources 630 may be recorded or output or the position of each of plurality of links 613 may be recorded or output instead of the torque of each of plurality of driving sources 630. At this time, the recorded or output torque of each of plurality of driving sources 630 (the operation amount of each of plurality of driving sources 630 or the position of each of plurality of links 613) is reflected on an output of each of plurality of driving sources 630 during the operation of link actuating device 600. Consequently, it is possible to suppress backlash of rotation pair units during the operation of link actuating device 600.

Effects of Link Actuating Device 600

In link actuating device 600, by inserting origin positioning member 620 into first through-holes 614*aa* of plurality of intermediate link hubs 614, it is possible to perform origin positioning for distal end link hub 612. Therefore, in link actuating device 600, in the origin positioning for distal end link hub 612, origin positioning member 620 is suppressed from interfering with the end effector attached to distal end link hub 612.

Sixth Embodiment

A link actuating device according to a sixth embodiment (hereinafter referred to as "link actuating device 600A") is explained. Here, differences from link actuating device 600 are mainly explained and redundant explanation is not repeated.

Figure 20:
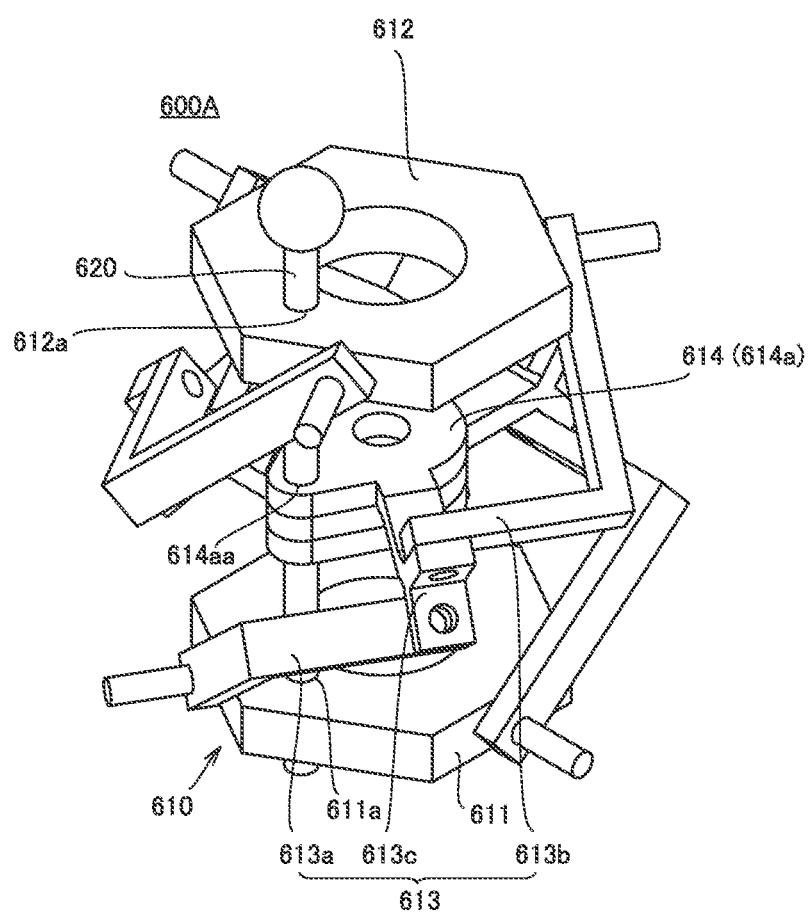
FIG. 20 is a perspective view of a link actuating device 600A.
Figure 21:
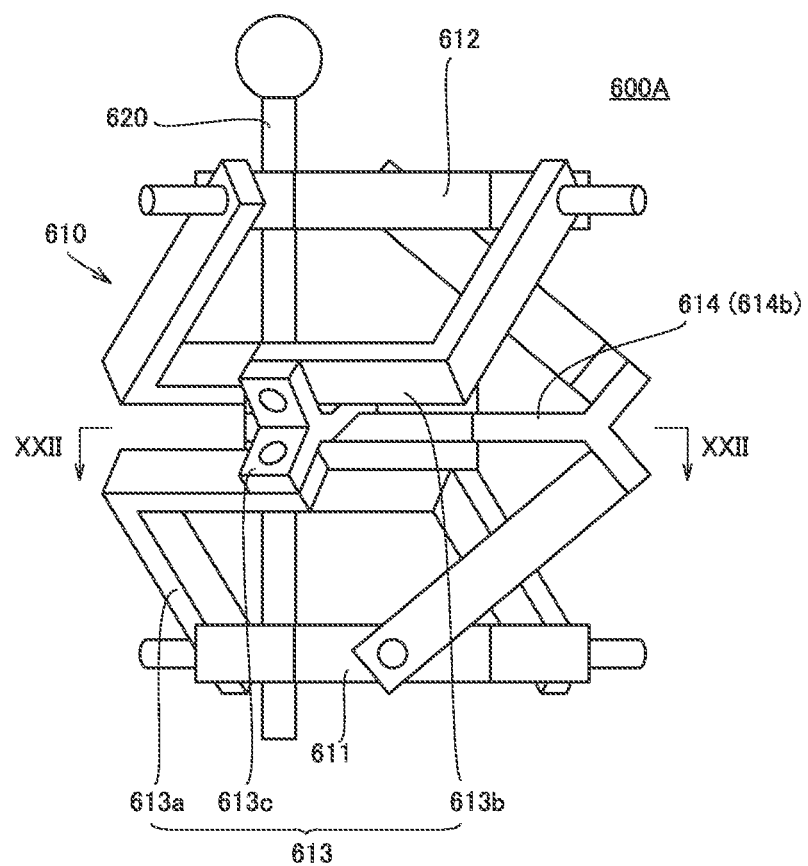
FIG. 21 is a front view of link actuating device 600A.
Figure 22:
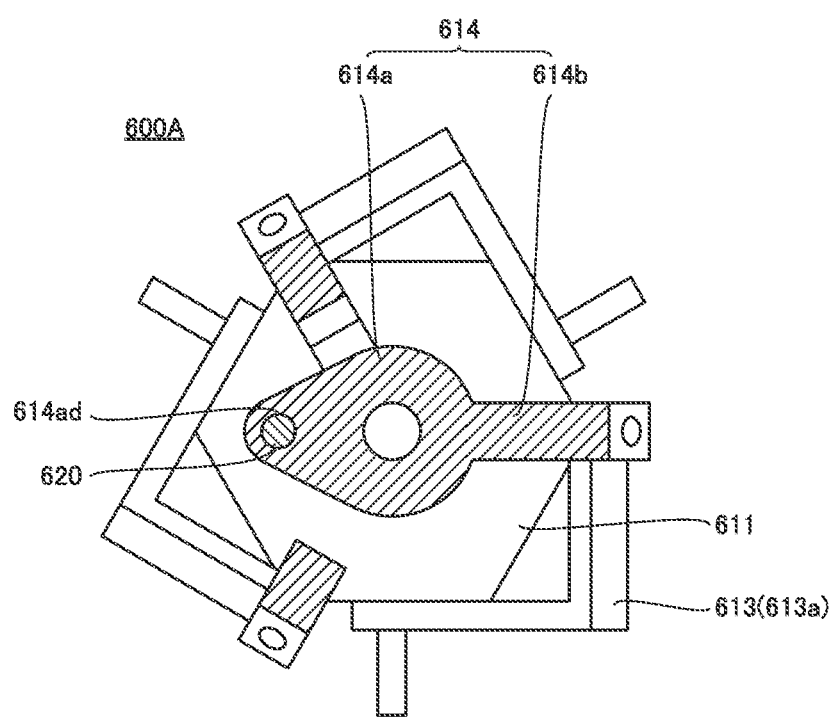
FIG. 22 is a sectional view in XXII-XXII in FIG. 21.
Figure 23:
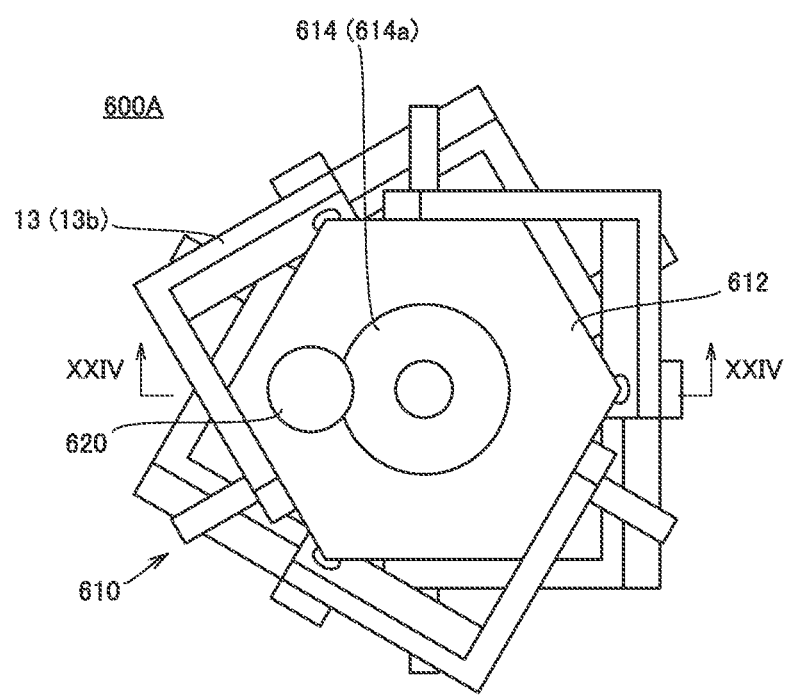
FIG. 23 is a plan view of link actuating device 600A.
Figure 24:
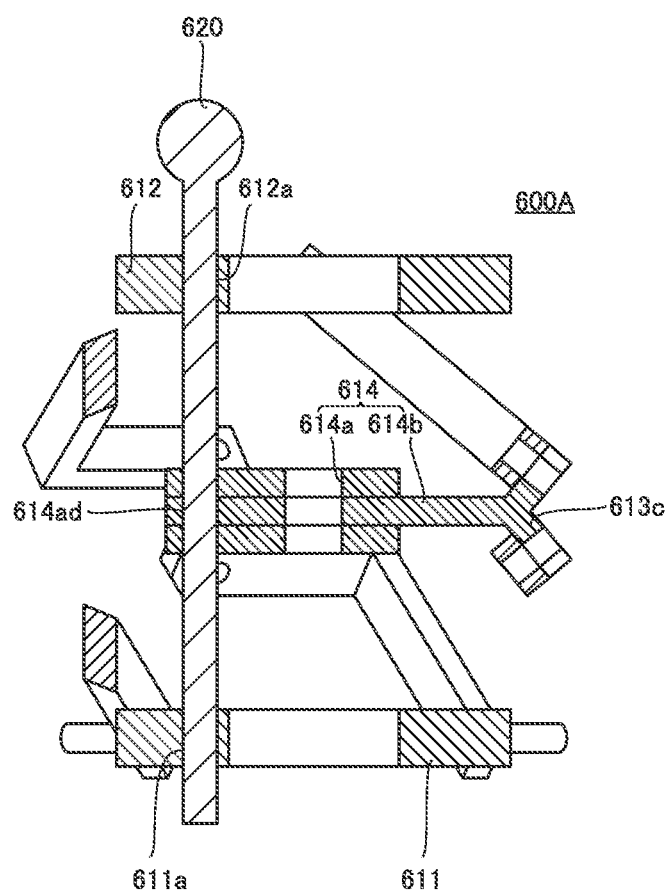
FIG. 24 is a sectional view in XXIV-XXIV in FIG. 23.

FIG. 20 is a perspective view of link actuating device 600A. FIG. 21 is a front view of link actuating device 600A. FIG. 22 is a sectional view in XXII-XXII in FIG. 21. FIG. 23 is a plan view of link actuating device 600A. FIG. 24 is a sectional view in XXIV-XXIV in FIG. 23. Nate that, in FIG. 20 to FIG. 24, illustration of driving source 630 is omitted. As shown in FIG. 20 to FIG. 24, in link actuating device 600A, a second through-hole 614*ad* is formed in coupling section 614*a* of each of plurality of intermediate link hubs 614.

Second through-hole 614*ad* pierces through coupling section 614*a* in the direction of the fifth rotation axis. Second through-hole 614*ad* is present in a position deviating from the center of coupling section 614*a*. Second through-holes 614*ad* of plurality of intermediate link hubs 614 are formed to overlap one another when distal end link hub 612 is present in the origin position.

In link actuating device 600A, when distal end link hub 612 is present in the origin position, origin positioning member 620 is inserted into second through-hole 614*ad* of each of plurality of intermediate link hubs 614. Consequently, plurality of intermediate link hubs 614 become incapable of mutually rotating about the fifth rotation axis. Note that, in link actuating device 600A, origin positioning member 620 is bar-like.

In link actuating device 600A, a third through-hole 611*a* is formed in proximal end link hub 611 and a fourth through-hole 612*a* is formed in distal end link hub 612. Third through-hole 611*a* is formed in a position deviating from the center of proximal end link hub 611. Fourth through-hole 612*a* is present in a position deviating from the center of distal end link hub 612. When distal end link hub 612 is present in the origin position, third through-hole 611*a* and fourth through-hole 612*a* are present in positions where third through-hole 611*a* and fourth through-hole 612*a* overlap second through-hole 614*ad* of each of plurality of intermediate link hubs 614. When distal end link hub 612 is present in the origin position, origin positioning member 620 is inserted into third through-hole 611*a* and fourth through-hole 612*a*, in addition to second through-hole 614*ad* of each of plurality of intermediate link hubs 614.

In link actuating device 600A, when distal end link hub 612 is present in the origin position, origin positioning member 620 is inserted into second through-hole 614*ad* of each of plurality of intermediate link hubs 614, whereby plurality of intermediate link hubs 614 become incapable of mutually rotating about the fifth rotation axis. Therefore, in link actuating device 600A, in the origin positioning for distal end link hub 612, origin positioning member 620 is suppressed from interfering 20 with the end effector attached to distal end link hub 612.

In link actuating device 600A, when distal end link hub 612 is present in the origin position, origin positioning member 620 is inserted into third through-hole 611*a* and fourth through-hole 612*a* in addition to second through-hole 614*ad* of each of plurality of intermediate link hubs 614. Therefore, in link actuating device 600A, the origin positioning for distal end link hub 612 by origin positioning member 620 is more firmly performed. Note that, since fourth through-hole 612*a* is present in a position deviating from the center of distal end link hub 612, in the origin positioning for distal end link hub 612, origin positioning member 620 less easily interferes with the end effector attached to distal end link hub 612.

Seventh Embodiment

A link actuating device according to a seventh embodiment (hereinafter referred to as "link actuating device 600B") is explained. Here, differences from link actuating device 600A are mainly explained and redundant explanation is not repeated.

Figure 25:
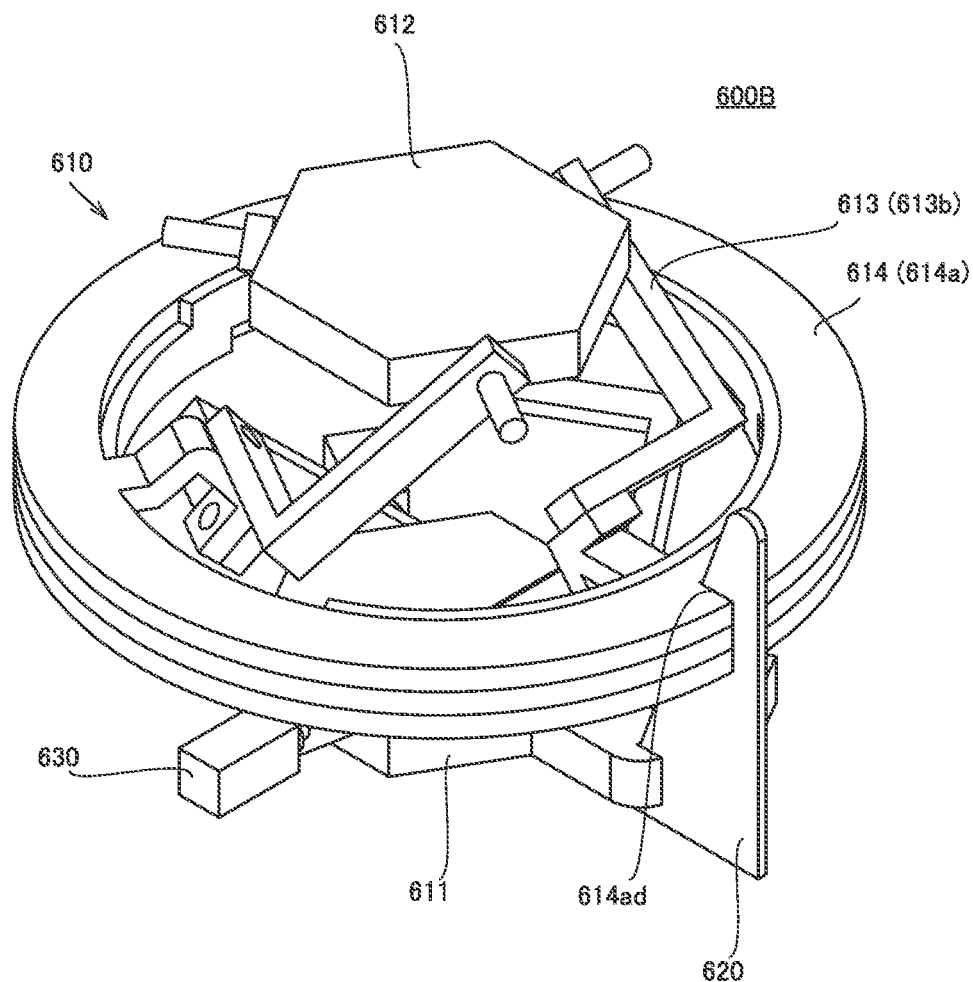
FIG. 25 is a perspective view of a link actuating device 600B.
Figure 26:
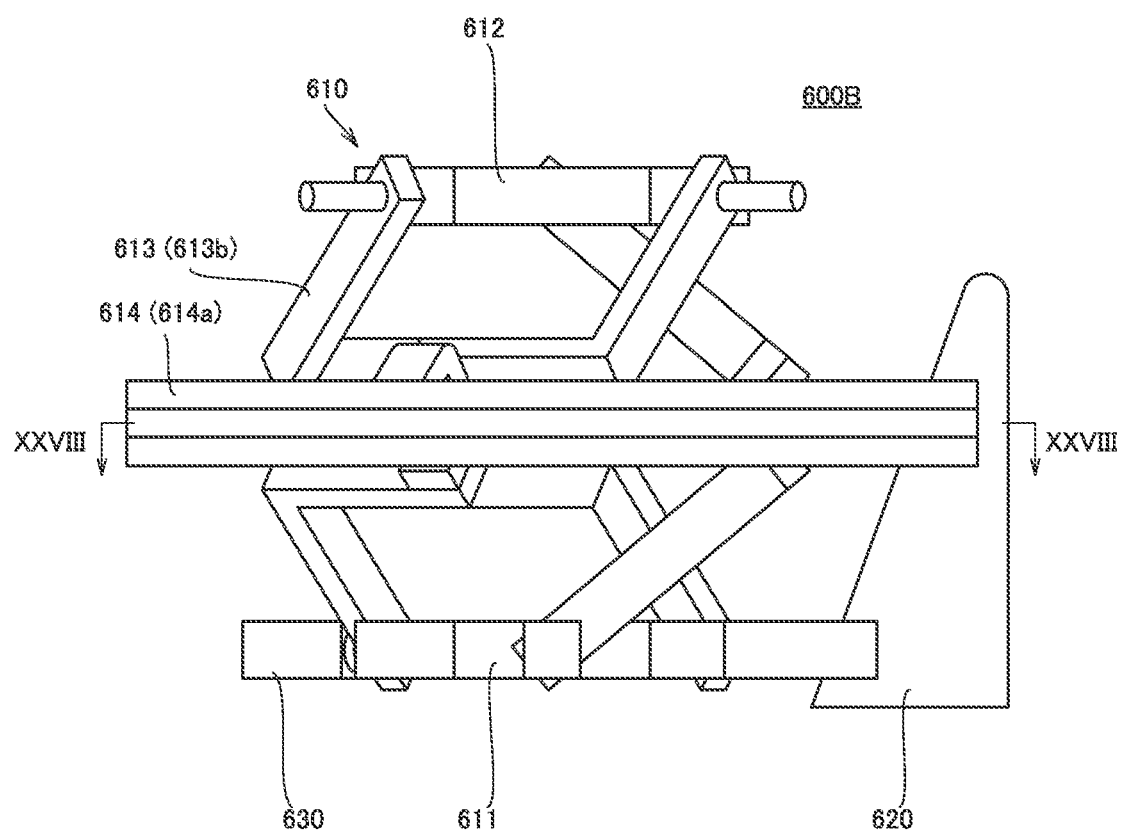
FIG. 26 is a front view of link actuating device 600B.
Figure 27:
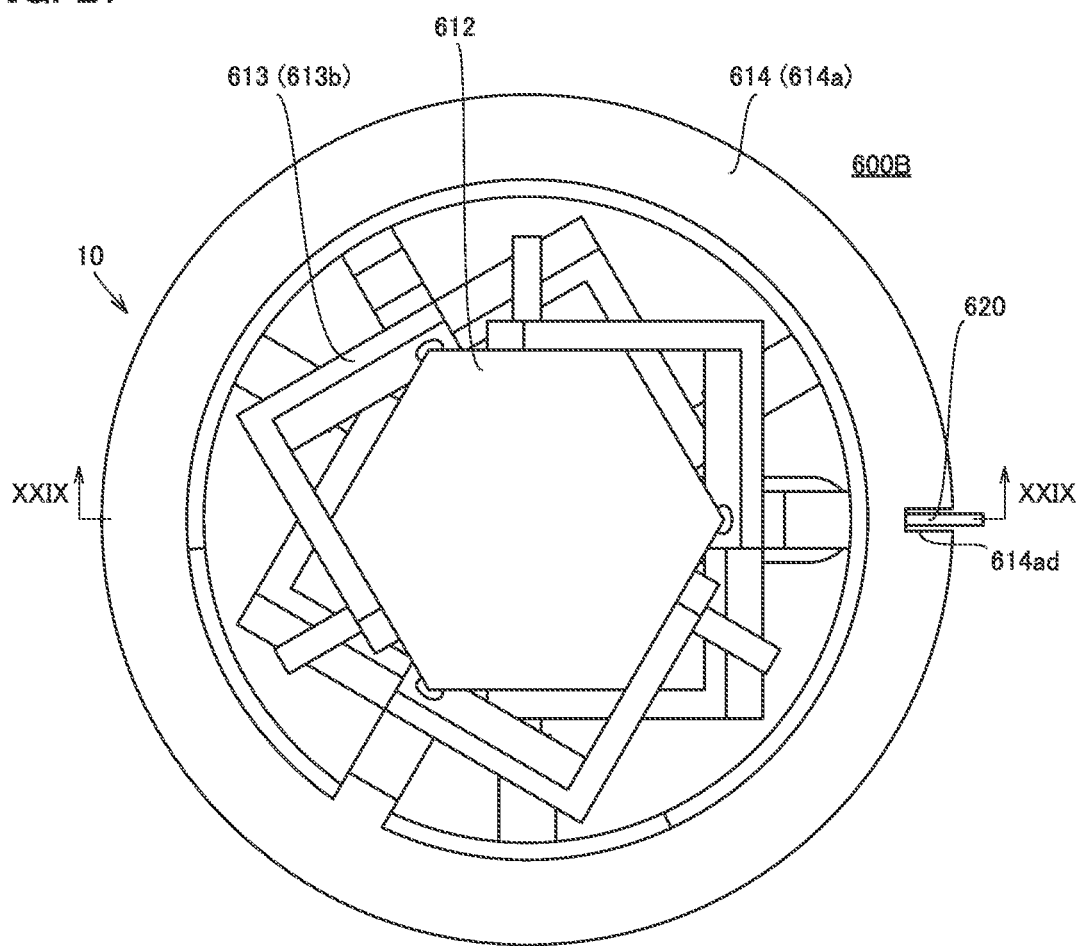
FIG. 27 is a plan view of link actuating device 600B.
Figure 28:
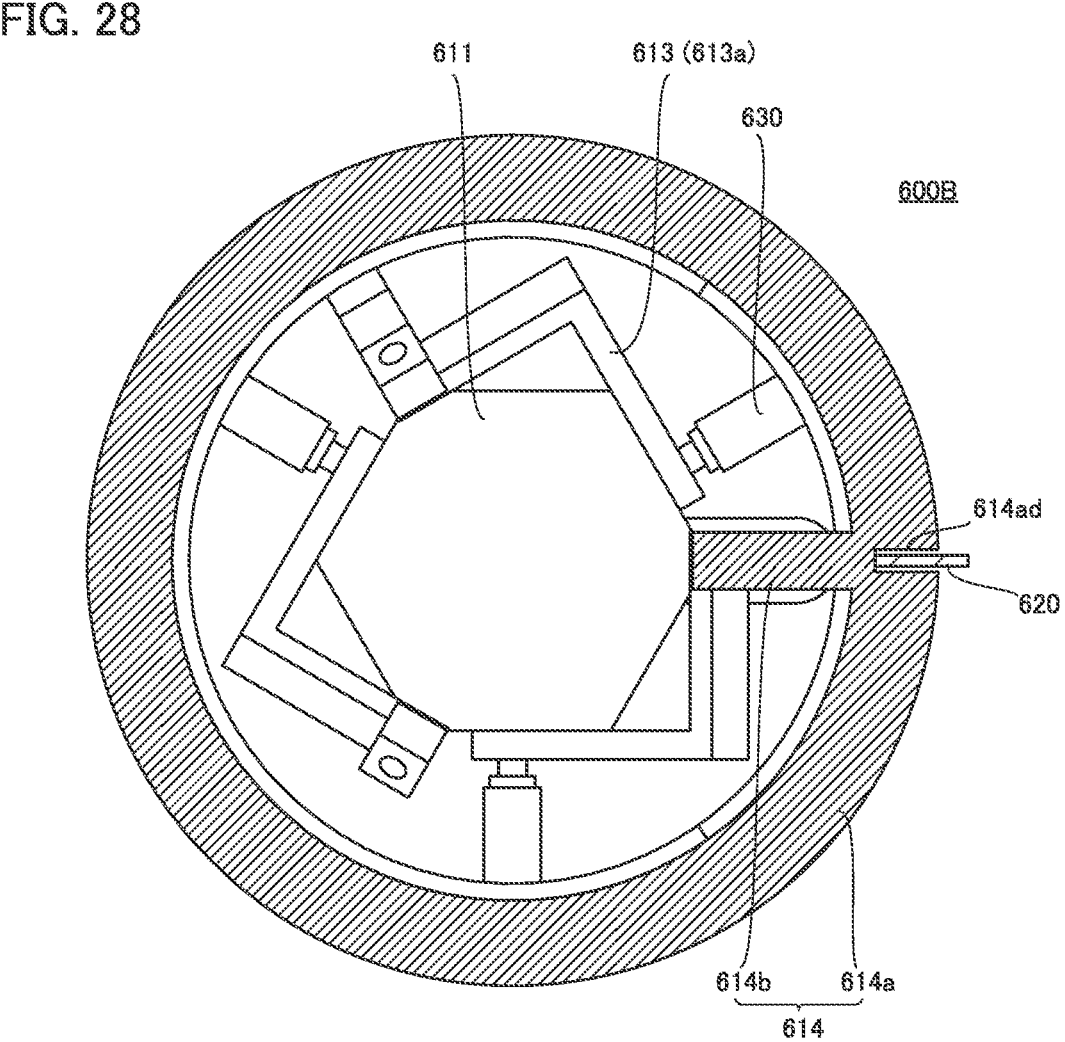
FIG. 28 is a sectional view in XXVIII-XXVIII in FIG. 26.
Figure 29:
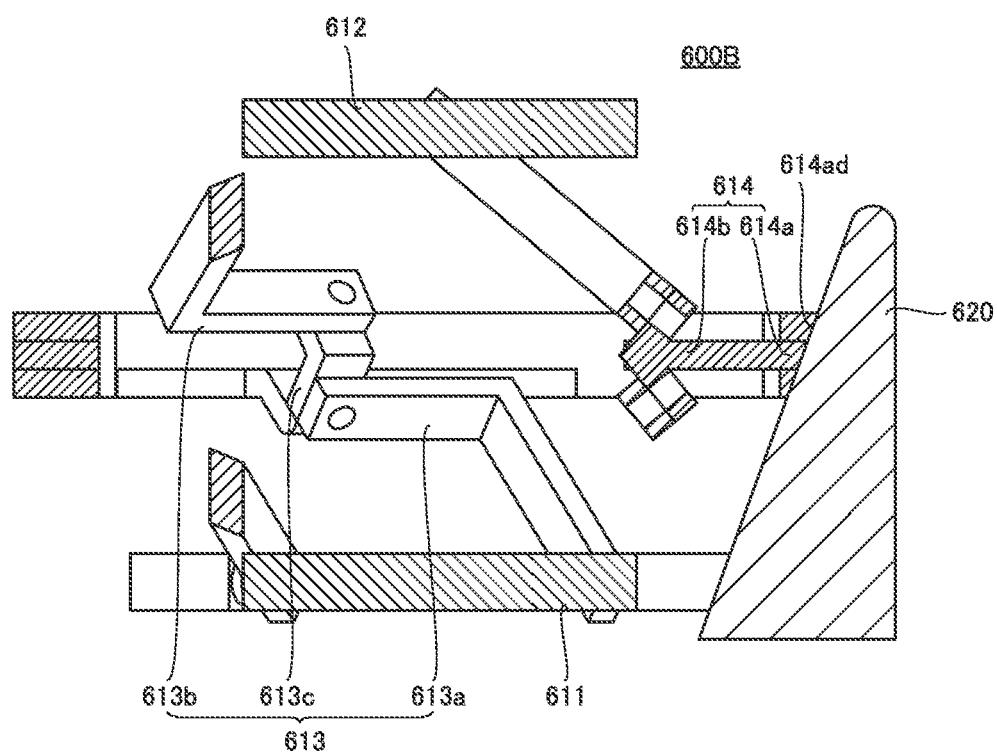
FIG. 29 is a sectional view in XXIX-XXIX in FIG. 27.

FIG. 25 is a perspective view of link actuating device 600B. FIG. 26 is a front view of link actuating device 600B. FIG. 27 is a plan view of link actuating device 600B. FIG. 28 is a sectional view in XXVIII-XXVIII in FIG. 26. FIG. 29 is a sectional view in XXIX-XXIX in FIG. 27. As shown in FIG. 25 to FIG. 29, in link actuating device 600B, coupling section 614*a* is disposed on the outer side of plurality of links 613. In link actuating device 600B, coupling section 614*a* is annular.

In link actuating device 600B, second through-hole 614*ad* is formed in a slit shape on the outer circumferential surface of coupling section 614*a*. In link actuating device 600B, second through-hole 614*ad* extends from the outer circumferential surface of coupling section 614*a* to the radial direction inner side of coupling section 614*a*.

In link actuating device 600B, origin positioning member 620 is plate-like. In link actuating device 600B, when distal end link hub 612 is present in the origin position, origin positioning member 620 is inserted into second through-hole 614*ad* of each of plurality of intermediate link hubs 614. Consequently, plurality of intermediate link hubs 614 become incapable of mutually rotating about the fifth rotation axis.

As explained above, in link actuating device 600B, when distal end link hub 612 is present in the origin position, origin positioning member 620 is inserted into second through-hole 614*ad* of each of plurality of intermediate link hubs 614, whereby plurality of intermediate link hubs 614 become incapable of mutually rotating about the fifth rotation axis. In link actuating device 600B, coupling section 614*a* is disposed on the outer side of plurality of links 613. Therefore, in link actuating device 600B, in the origin positioning for distal end link hub 612, origin positioning member 620 is suppressed from interfering with the end effector attached to distal end link hub 612.

Eighth Embodiment

In a link actuating device according to an eighth embodiment hereinafter referred to as "link actuating device 600C") is explained. Here, differences from link actuating device 600A are mainly explained and redundant explanation is not repeated.

Figure 30:
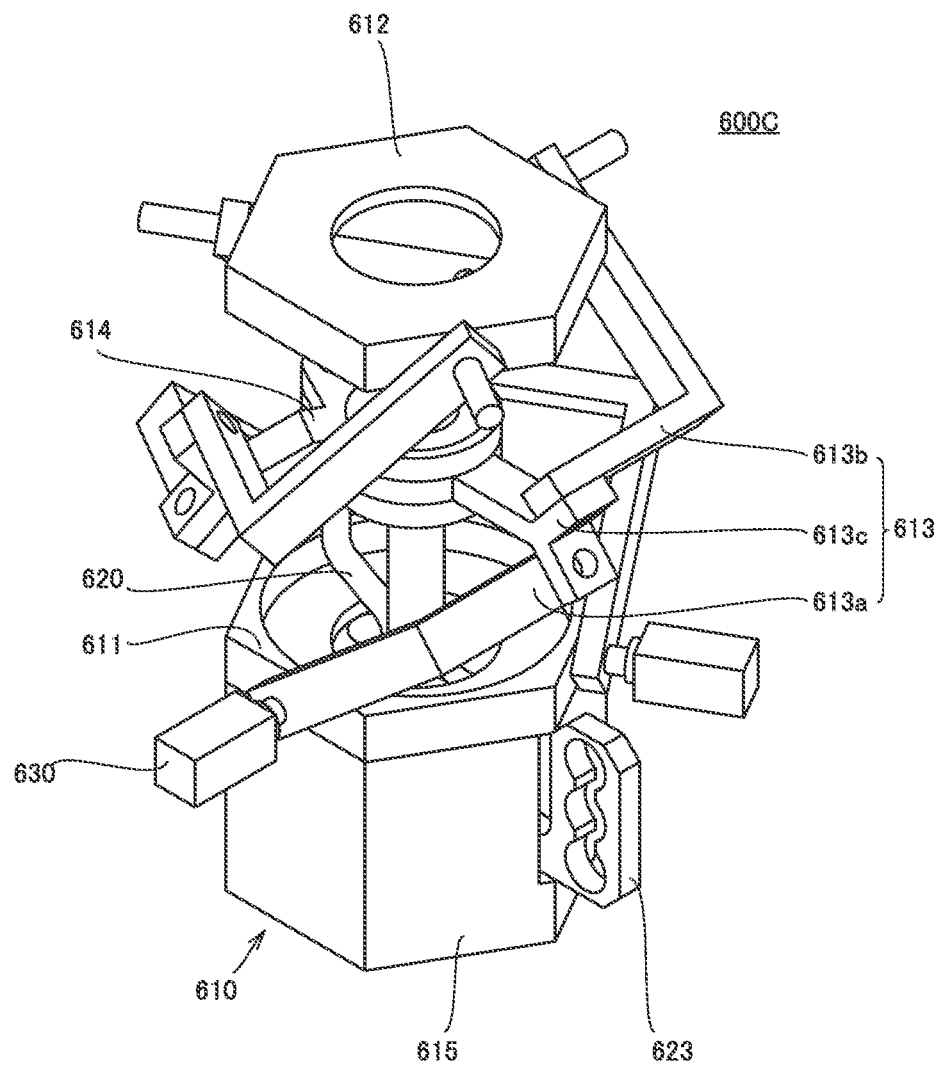
FIG. 30 is a perspective view of a link actuating device 600C.
Figure 31:
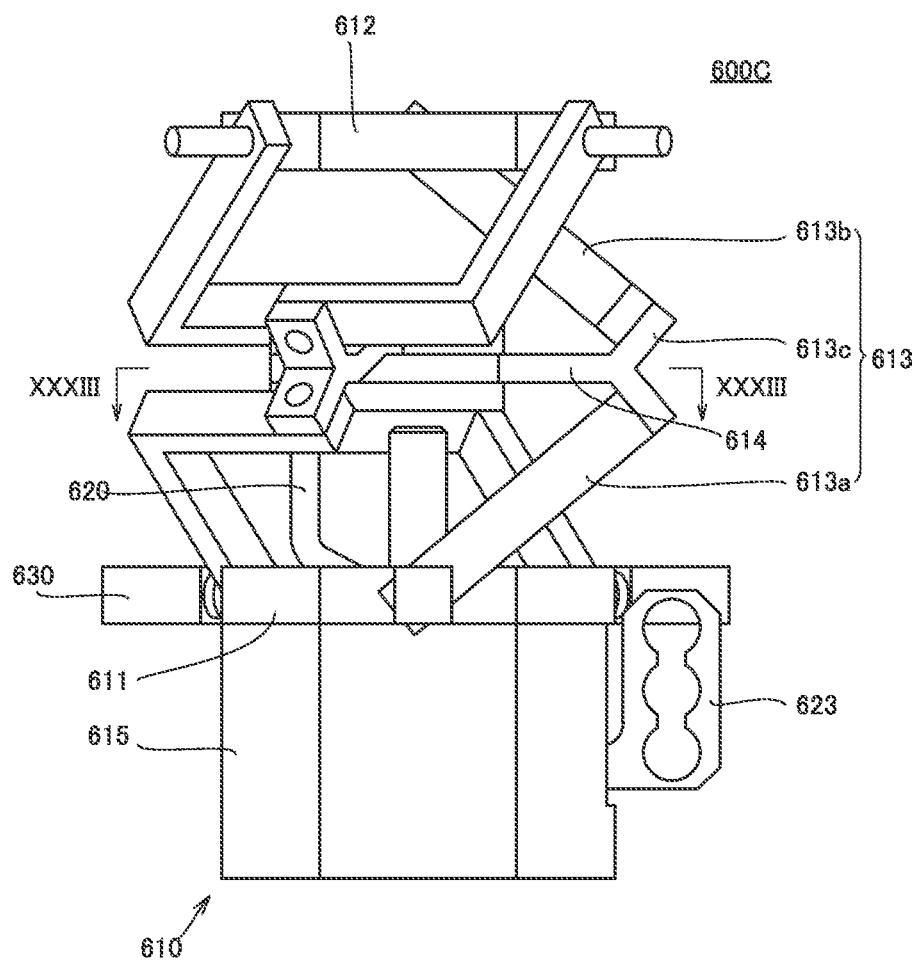
FIG. 31 is a front view of link actuating device 600C.
Figure 32:
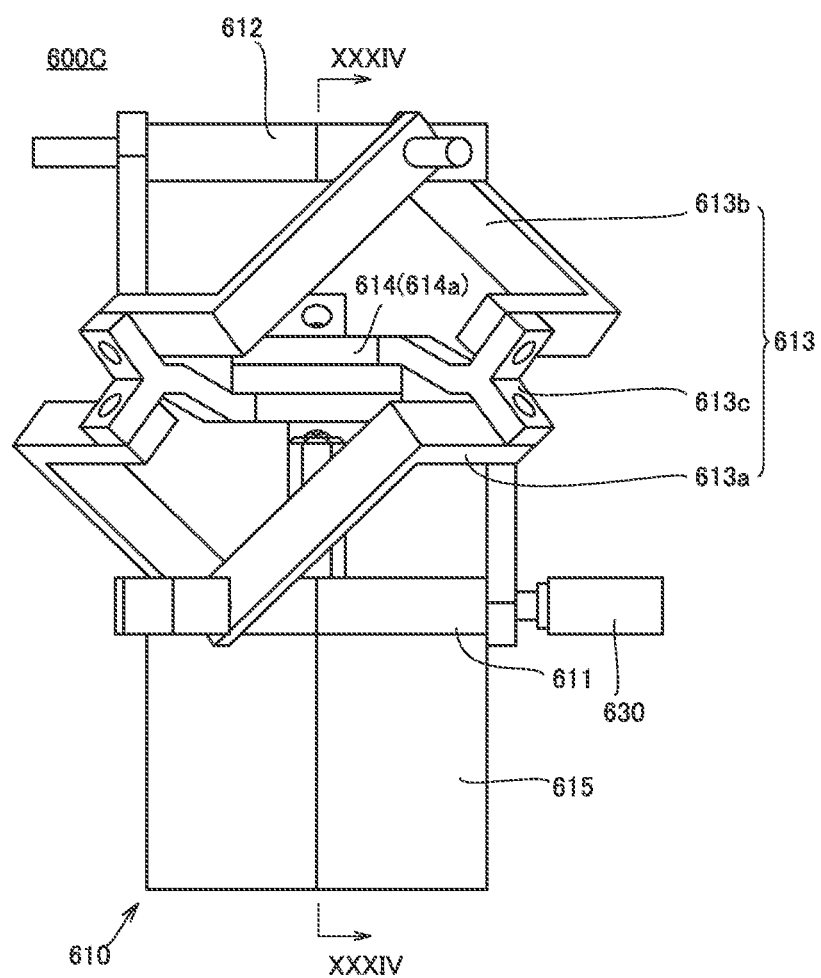
FIG. 32 is a side view of link actuating device 6000.
Figure 33:
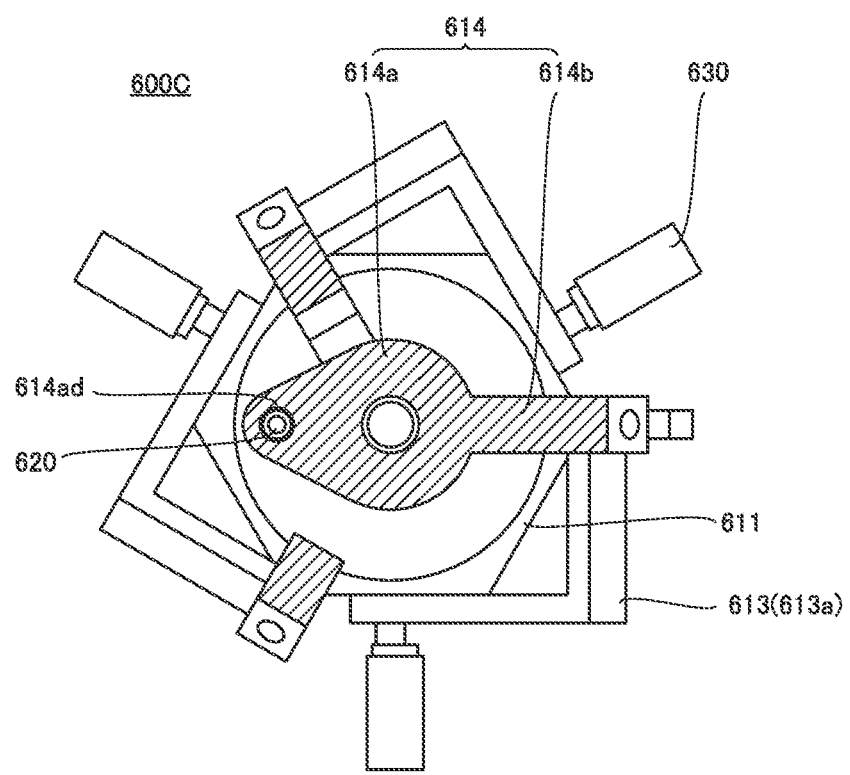
FIG. 33 is a sectional view in XXXIII-XXXIII in FIG. 31.
Figure 34:
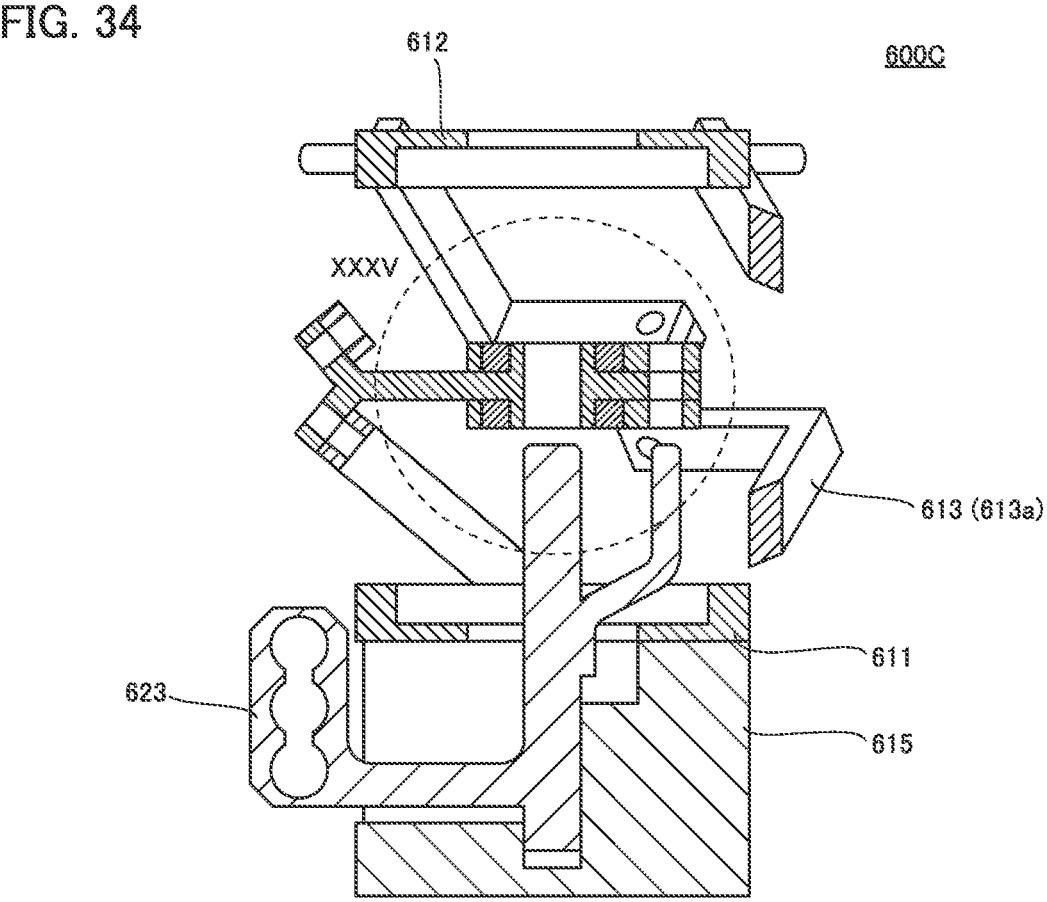
FIG. 34 is a sectional view in XXXIV-XXXIV in FIG. 32.
Figure 35:
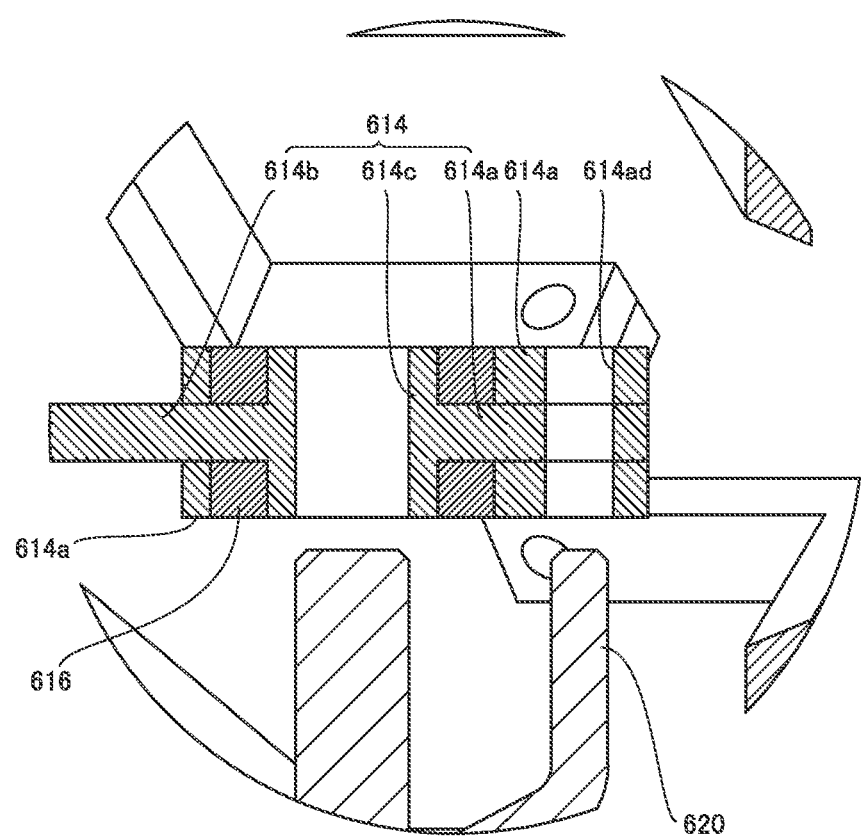
FIG. 35 is an enlarged view in a region XXXV in FIG. 34.

FIG. 30 is a perspective view of link actuating device 600C. FIG. 31 is a front view of link actuating device 600C. FIG. 32 is a side view of link actuating device 600C. FIG. 33 is a sectional view in XXXIII-XXXIII in FIG. 31. FIG. 34 is a sectional view in XXXIV-XXXIV in FIG. 32. FIG. 35 is an enlarged view in a region XXXV in FIG. 34. As shown in FIG. 30 to FIG. 35, in link actuating device 600C, spherical surface link mechanism 610 further includes a housing member 615. Housing member 615 is attached to proximal end link hub 611.

In link actuating device 600O, one intermediate link hub 614 among plurality of intermediate link hubs 614 is referred to as a first intermediate link hub and other intermediate link hubs 614 among plurality of intermediate link hubs 614 are referred to as second intermediate link hubs. In link actuating device 600C, coupling section 614*a* of the first intermediate link hub includes a shaft section 614*c*. Shaft section 614*c* has a tubular shape extending in the direction of the fifth rotation axis.

Coupling section 614*a* of the second intermediate link hub is attached to shaft section 614*c* to be rotatable about shaft section 614*c*. Consequently, coupling sections 614*a* of plurality of intermediate link hubs 614 are capable of mutually rotating about the fifth rotation axis. Note that rotation resistance reducing members 616 are disposed between shaft section 614*c* and coupling section 614*a* of the second intermediate link hub. Consequently, rotation resistance between shaft section 614*c* and coupling section 614*a* of the second intermediate link hub is reduced. Rotation resistance reducing members 616 are, for example, roiling bearings or slide bearings.

In link actuating device 600C, when distal end link hub 612 is present in the origin position, origin positioning member 620 is inserted into second through-hole 614*ad*. Consequently, plurality of intermediate link hubs 614 become incapable of mutually rotating about the fifth rotation axis. Note that, when distal end link hub 612 is present in the origin position, origin positioning member 620 may be inserted into shaft section 614*c* in addition to second through-hole 614*ad*.

In link actuating device 600C, origin positioning member 620 may include a grasping section 623. In link actuating device 600C, by lifting grasping section 623 upward when distal end link hub 612 is present in the origin position, origin positioning member 620 is inserted into second through-hole 614*ad* and shaft section 614*c*.

In link actuating device 5000, origin positioning member 620 is housed in housing member 615. That is, in link actuating device 600C, origin positioning member 620 is held by spherical surface link mechanism 610. However, in origin positioning member 620, a portion inserted into second through-hole 614*ad* and shaft section 614*c* and grasping section 623 are located on the outside of housing member 615.

As explained above, in link actuating device 600C, when distal end link hub 612 is present in the origin position, origin positioning member 620 is inserted into second through-hole 614*ad* of each of plurality of intermediate link hubs 614, whereby plurality of intermediate link hubs 614 become incapable of mutually rotating about the fifth rotation axis. Therefore, in link actuating device 600C, in origin positioning for distal end link hub 612, origin positioning member 620 is suppressed from interfering with the end effector attached to distal end link hub 612.

In link actuating device 600C, origin positioning member 620 is held by spherical surface link mechanism 610 (housing member 615). Therefore, in link actuating device 600C, loss and drop of origin positioning member 620 are suppressed.

Ninth Embodiment

A link actuating device according to a ninth embodiment (hereinafter referred to as "link actuating device 600D") is explained. Here, differences from link actuating device 600A are mainly explained and redundant explanation is not repeated.

Figure 36:
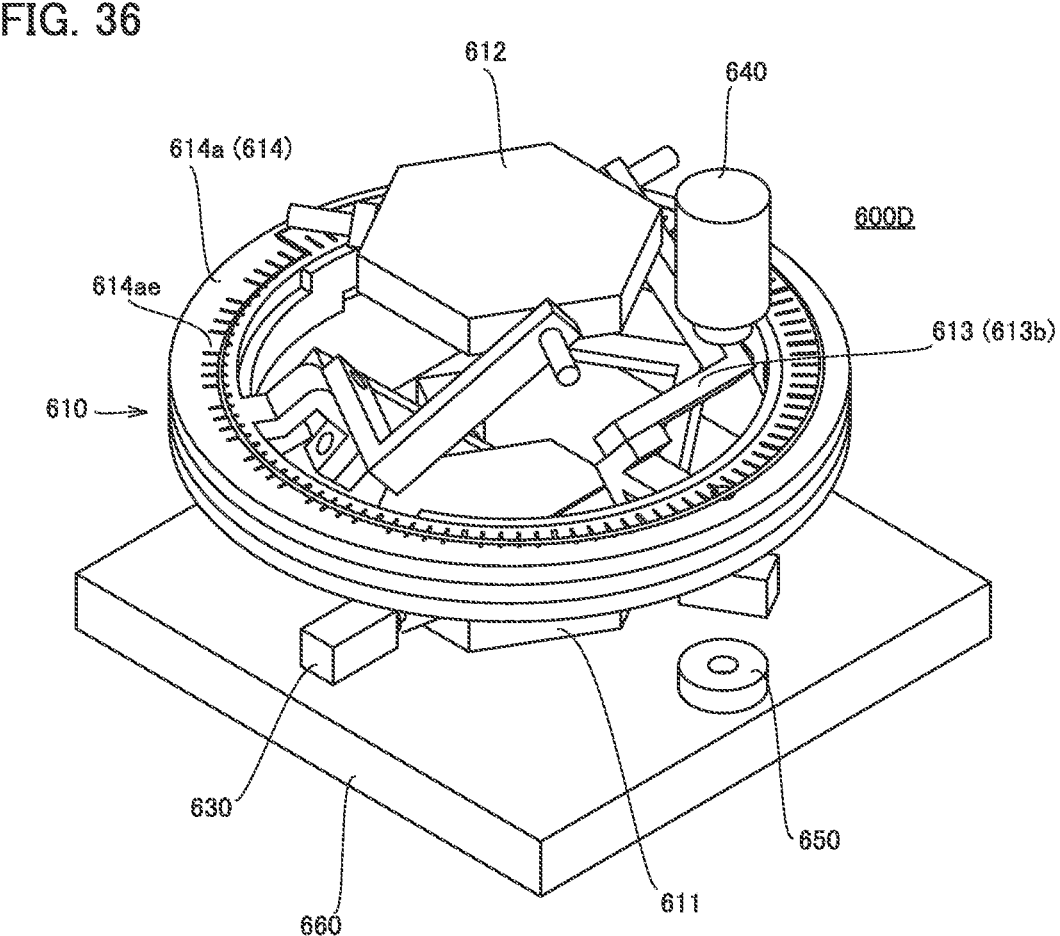
FIG. 36 is a perspective view of a link actuating device 600D.
Figure 37:
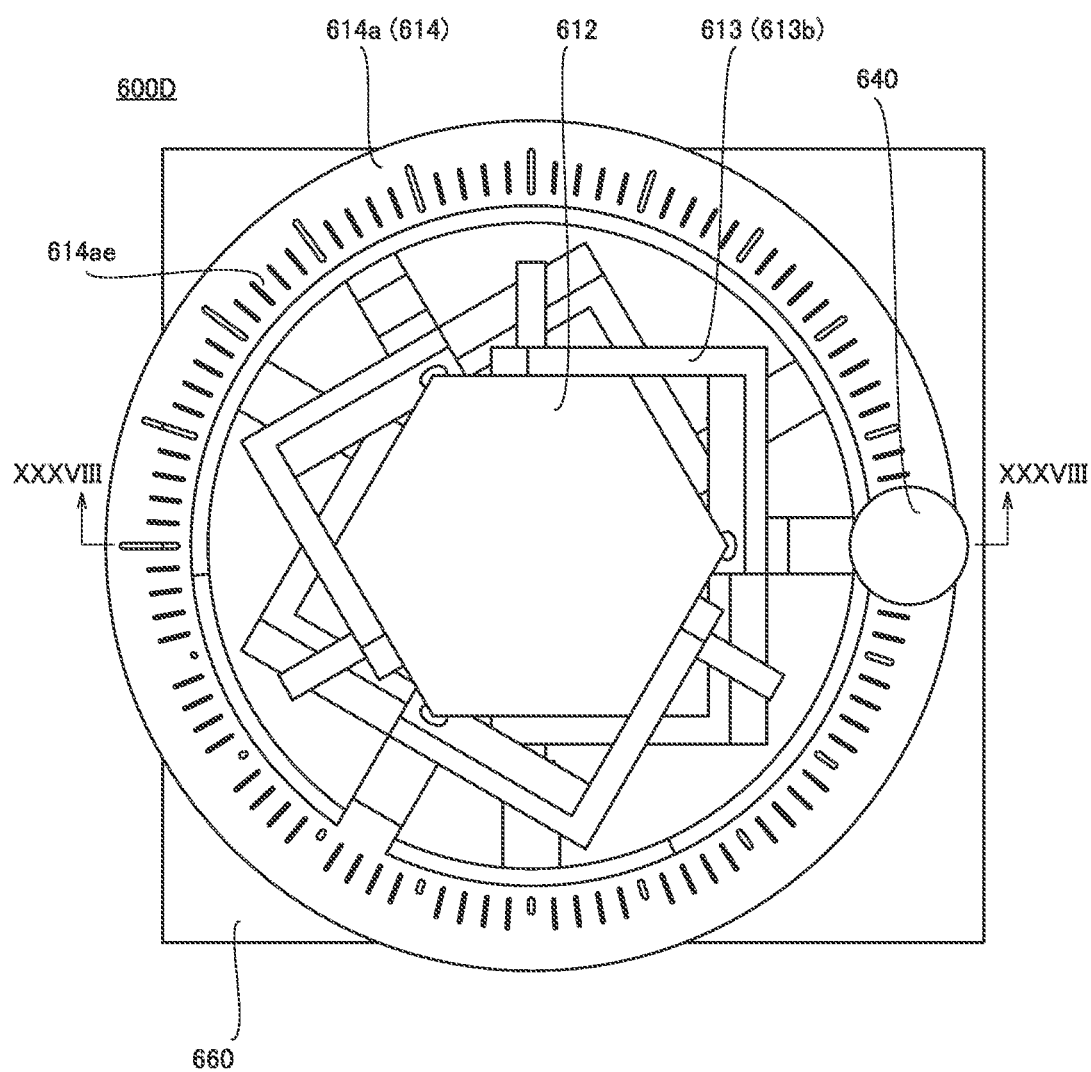
FIG. 37 is a plan view of link actuating device 600D.
Figure 38:
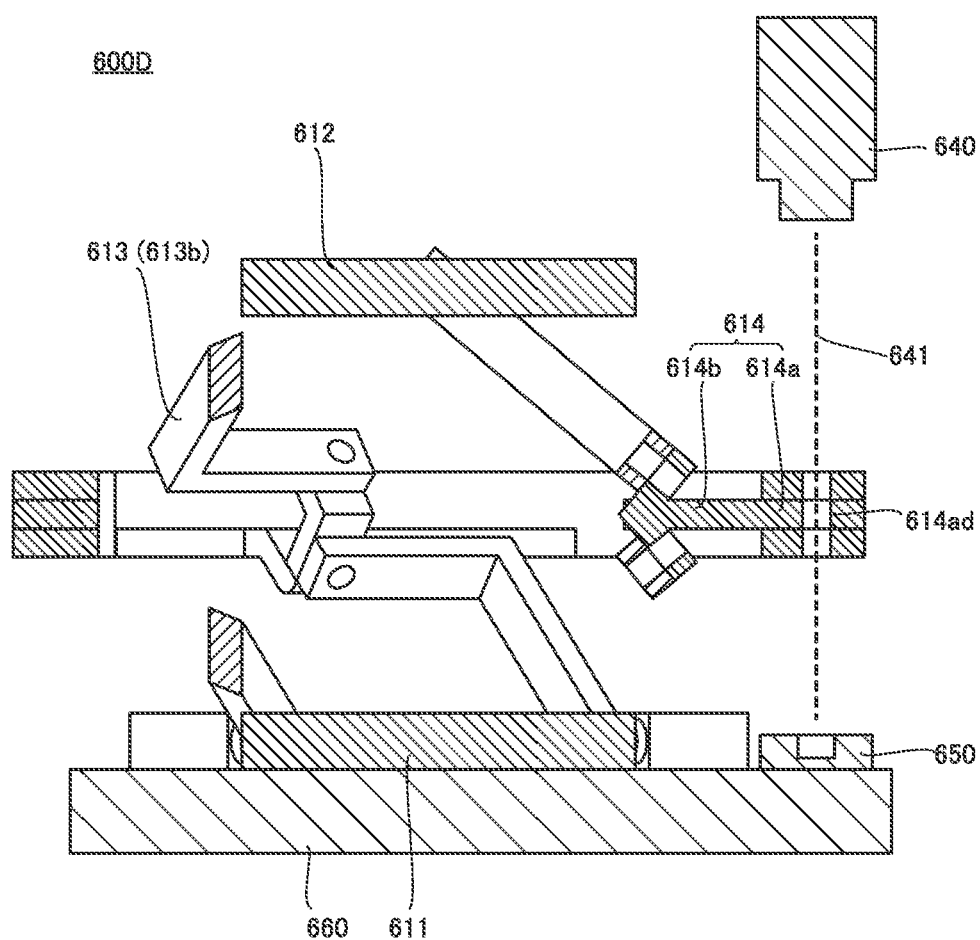
FIG. 38 is a sectional view in XXXVIII-XXXVIII in FIG. 37.

FIG. 36 is a perspective view of link actuating device 600D. FIG. 37 is a plan view of link actuating device 600D. FIG. 38 is a sectional view in XXXVIII-XXXVIII in FIG. 37. As shown in FIG. 36 to FIG. 38, link actuating device 600D includes a light source 640, a detector 650, and a stand 660. However, link actuating device 600D does not include origin positioning member 620.

In link actuating device 600D, spherical surface link mechanism 610 and detector 650 are disposed on stand 660. In link actuating device 600D, coupling section 614*a* is disposed on the outer side of plurality of links 613. In link actuating device 600D, coupling section 614*a* is annular.

Light source 640 generates light 641. Light source 640 is, for example, a laser oscillator. Light 641 is laser light. Second through-holes 614*ad* of plurality of intermediate link hubs 614 overlap one another when distal end link hub 612 is present in the origin position. Light 641 is applied to detector 650 passing through second through-hole 614*ad* of each of plurality of intermediate link hubs 614 when distal end link hub 612 is present in the origin position. On the other hand, if distal end link hub 612 is absent from the origin position, light 641 is blocked by coupling section 614*a* of each of plurality of intermediate link hubs 614 and is not applied to detector 650.

Light 641 is applied to detector 650, whereby detector 650 outputs a signal indicating that light 641 is applied. Detector 650 is for example, a photodiode. Therefore, it is detected based on the output signal from detector 650 that distal end link hub 612 is present in the origin position.

An encoder 614*ae* is provided in coupling section 614*a*. When distal end link hub 612 is present in the origin position, a value of encoder 614*ae* is recorded. By comparing a value of encoder 614*ae* at the time when link actuating device 600D is operating and a value of encoder 614*ae* recorded when distal end link hub 612 is present in the origin position, it is possible to determine a position of distal end link hub 612 during the operation of link actuating device 600D.

In link actuating device 600D, by allowing light 641 to pass through second through-holes 614*ad* of plurality of intermediate link hubs 614, it is possible to perform the origin positioning for distal end link huh 612. Therefore, in link actuating device 600, it is unnecessary to use origin positioning member 620 in origin positioning for distal end link hub 612. Origin positioning member 620 is suppressed from interfering the end effector attached to distal end link hub 612.

The embodiments of the present invention are explained above. However, it is also possible to variously modify the embodiments explained above. The scope of the present invention is not limited to the embodiments explained above. The scope of the present invention is indicated by the claims and is intended to include all changes within meaning and a scope equivalent to the claims.

INDUSTRIAL APPLICABILITY

The embodiments explained above can be particularly advantageously applied to a spherical surface link mechanism, a spherical surface link actuating device, a link actuating device, and an origin positioning method.

REFERENCE SIGNS LIST

100 Spherical surface link mechanism, 10 Proximal end link hub, 10*a* First surface, 10*b* Second surface, 10*c* Projecting section, 20 Distal end link hub, 20*a* First surface, 20*b* Second surface, 20*c* Projecting section, 30 Link, 31 First end link member, 32 Second end link member, 33 Intermediate link member, 34, 35, 36, 37, 38 Shaft member, 38*a* Through-hole, 38*b* Retaining ring, 38*c* Spacer, 38*d* Through-hole, 39 Outer ring, 39*a* First member., 39*b* Second member, 40 Intermediate link hub, 41 Coupling section, 41*a* Through-hole, 42 Beam section, 50 Bearing, 60*a*, 60*b* Falling-off preventing ring, 200 Spherical surface link mechanism, 300 Spherical surface link mechanism, 400 Spherical surface link actuating device, 500 Driving source, CL1, CL2 Center axis, IP Intermediate plane, P1 Spherical surface link center point, P2 Spherical surface link center point, RA1 First rotation axis, RA2 Second rotation axis, RA3 Third rotation axis, RA4 Fourth rotation axis, RA5 Fifth rotation axis, SP1, SP2 Moving spherical surface, 610 Spherical surface link mechanism, 611 Proximal end link hub, 611*a* Third through-hole, 612 Distal end link hub, 612*a* Fourth through-hole, 613 Link, 613*a* First end link member, 613*b* Second end link member, 613*c* Intermediate link member, 614 Intermediate link hub, 614*a* Coupling section, 614*aa* First through-hole, 614*ab* First groove, 614*ac* Second groove, 614*ad* Second through-hole, 614*ae* Encoder, 614*b* Beam section, 614*c* Shaft section, 615 Housing member, 616 Rotation resistance reducing member, 620 Origin positioning member, 620*a* First end, 620*b* Second end, 621 First portion, 622 Second portion, 623 Grasping section, 630 Driving source, 640 Light source, 641 Light, 650 Detector, 660 Stand, 600, 600A, 600B, 600C, 600D Link actuating device, S1 Preparation step, S2 Origin positioning member insertion step, S3 Preload step, S4 Recording step.

The invention claimed is:

1. A link actuating device comprising:
a spherical surface link mechanism; and
an origin positioning member,
wherein the spherical surface link mechanism includes:
a proximal end link hub;
a distal end link hub;
a plurality of links;
a plurality of intermediate link hubs; and
a shaft member,
wherein each of the plurality of links includes a first end link member, a second end link member, and an intermediate link member,
wherein the first end link member is coupled, at one end of the first end link member, to the proximal end link hub to be rotatable about a first rotation axis,
wherein the second end link member is coupled, at one end of the second end link member, to the distal end link hub to be rotatable about a second rotation axis,
wherein the intermediate link member is coupled, at one end of the intermediate link member, to another end of the first end link member to be rotatable about a third rotation axis and is coupled to, at another end of the intermediate link member, another end of the second end link member to be rotatable about a fourth rotation axis,
wherein a first center axis of the proximal end link hub, the first rotation axis, and the third rotation axis cross at a first spherical surface link center point,
wherein a second center axis of the distal end link hub, the second rotation axis, and the fourth rotation axis cross at a second spherical surface link center point,
wherein each of the plurality of intermediate link hubs is connected to the intermediate link member of each of the plurality of links,
wherein the plurality of intermediate link hubs are coupled to one another by the shaft member to be rotatable about a fifth rotation axis that passes the first spherical surface link center point and the second spherical surface link center point, and
wherein the origin positioning member disables two or more of the plurality of intermediate link hubs to mutually rotate about the fifth rotation axis when the distal end link hub is present in an origin position.

2. The link actuating device according to claim 1, wherein the spherical surface link mechanism includes a bearing that reduces friction between at least one of the plurality of intermediate link hubs and the shaft member.

3. The link actuating device according to claim 2, wherein the bearing is a rolling bearing.

4. The link actuating device according to claim 2, wherein the bearing is a slide bearing.

5. The link actuating device according to claim 1, wherein a through-hole piercing through the shaft member along the fifth rotation axis is formed in the shaft member.

6. The link actuating device according to claim 1, wherein the shaft member is formed integrally with one of the plurality of intermediate link hubs.

7. The link actuating device according to claim 1, wherein the shaft member is a member separate from the plurality of intermediate link hubs.

8. The link actuating device according to claim 1, further comprising:
at least two or more driving sources,
wherein a position and a posture of at least one of the proximal end link hub and the distal end link hub are determined by the at least two or more driving sources.

9. The link actuating device according to claim 8, wherein each of the at least two or more driving sources rotates the first end link member of each of the plurality of links about the first rotation axis.

10. The link actuating device according to claim 8, wherein each of the at least two or more driving sources rotates each of the plurality of intermediate link hubs about the fifth rotation axis.

11. The link actuating device according to claim 1, wherein
each of the plurality of intermediate link hubs includes a coupling section and a beam section,
the beam section is connected, at one end of the beam section, to the coupling section and connected, at another end of the beam section, to the intermediate link member,
a first through-hole piercing through the coupling section in a direction of the fifth rotation axis is formed in a center of the coupling section,
the first through-holes of the coupling sections of the plurality of intermediate link hubs overlap one another and the coupling sections of the plurality of intermediate link hubs are coupled to one another to be mutually rotatable about the fifth rotation axis, and
the origin positioning member is inserted into the first through-hole of each of the plurality of intermediate link hubs when the distal end link hub is present in the origin position.

12. The link actuating device according to claim 1, wherein
each of the plurality of intermediate link hubs includes a coupling section and a beam section,
the beam section is connected, at one end of the beam section, to the coupling section and connected, at another end of the beam section, to the intermediate link member,
a second through-hole piercing through the coupling section in a direction of the fifth rotation axis is formed in a position deviating from a center of the coupling section,
the second through-holes of the coupling sections of the plurality of intermediate link hubs overlap one another when the distal end link hub is present in the origin position and the coupling sections of the plurality of intermediate link hubs are coupled to one another to be mutually rotatable about the fifth rotation axis, and
the origin positioning member is inserted into the second through-hole of each of the plurality of intermediate link hubs when the distal end link hub is present in the origin position.

13. The link actuating device according to claim 12, wherein a third through-hole piercing through the proximal end link hub in a direction of the first center axis is formed in the proximal end link hub, a fourth through-hole piercing through the distal end link hub in a direction of the second center axis is formed in the distal end link hub, the second through-hole, the third through-hole, and the fourth through-hole of each of the plurality of intermediate link hubs are present in positions where the second through-hole, the third through-hole, and the fourth through-hole overlap one another when the distal end link hub is present in the origin position, and the origin positioning member is inserted into the second through-hole, the third through-hole, and the fourth through-hole of each of the plurality of intermediate link hubs when the distal end link hub is present in the origin position.

14. The link actuating device according to claim 12, wherein the coupling section of each of the plurality of intermediate link hubs is disposed on an outer side of the plurality of links.

15. The link actuating device according to claim 14, wherein the second through-hole is a slit formed on an outer circumferential surface of the coupling section.

16. The link actuating device according to claim 1, wherein the origin positioning member is detachable from the spherical surface link mechanism.

17. The link actuating device according to claim 1, wherein the origin positioning member is held by the spherical surface link mechanism.

18. A link actuating device comprising:
a spherical surface link mechanism;
a light source; and
a detector that receives light emitted from the light source, wherein the spherical surface link mechanism includes a proximal end link hub, a distal end link hub, a plurality of links, and a plurality of intermediate link hubs, each of the plurality of links includes a first end link member, a second end link member, and an intermediate link member, the first end link member is coupled, at one end of the first end link member, to the proximal end link hub to be rotatable about a first axis, the second end link member is coupled, at one end of the second end link member, to the distal end link hub to be rotatable about a second rotation axis, the intermediate link member is coupled, at one end of the intermediate link member, to another end of the first end link member to be rotatable about a third rotation axis and is coupled, at another end of the intermediate link member, to another end of the second end link member to be rotatable about a fourth rotation axis, a first center axis, which is a center axis of the proximal end link hub, the first rotation axis, and the third rotation axis cross at a first spherical surface link center point, a second center axis, which is a center axis of the distal end link hub, the second rotation axis, and the fourth rotation axis cross at a second spherical surface link center point, each of the plurality of intermediate link hubs is connected to the intermediate link member of each of the plurality of links, the plurality of intermediate link hubs are coupled to one another to be rotatable about a fifth rotation axis that passes the first spherical surface link center point and the second spherical surface link center point, each of the plurality of intermediate link hubs includes a coupling section and a beam section, the beam section is connected, at one end of the beam section, to the coupling section and connected, at another end of the beam section, to the intermediate link member, a second through-hole piercing through the coupling section in a direction of the fifth rotation axis is formed in a position deviating from a center of the coupling section, the second through-holes of the coupling sections of the plurality of intermediate link hubs overlap one another when the distal end link hub is present in an origin position and the coupling sections of the plurality of intermediate link hubs are coupled to one another to be mutually rotatable about the fifth rotation axis, a third through-hole piercing through the proximal end link hub in a direction of the first center axis is formed in the proximal end link hub, a fourth through-hole piercing through the distal end link hub in a direction of the second center axis is formed in the distal end link hub, the second through-hole, the third through-hole, and the fourth through-hole of each of the plurality of intermediate link hubs are present in positions where the second through-hole, the third through-hole, and the fourth through-hole overlap one another when the distal end link hub is present in the origin position, and the light is received by the detector passing through the second through-hole, the third through-hole, and the fourth through-hole of each of the plurality of intermediate link hubs when the distal end link hub is present in the origin position.

19. An origin positioning method comprising preparing a link actuating device including a spherical surface link mechanism, an origin positioning member, and a driving source, wherein the spherical surface link mechanism includes a proximal end link hub, a distal end link hub, a plurality of links, and a plurality of intermediate link hubs, each of the plurality of links includes a first end link member, a second end link member, and an intermediate link member, the first end link member is coupled, at one end of the first end link member, to the proximal end link hub to be rotatable about a first axis, the second end link member is coupled, at one end of the second end link member, to the distal end link hub to be rotatable about a second rotation axis, the intermediate link member is coupled, at one end of the intermediate link member, to another end of the first end link member to be rotatable about a third rotation axis and is coupled, at another end of the intermediate link member, to another end of the second end link member to be rotatable about a fourth rotation axis, a first center axis, which is a center axis of the proximal end link hub, the first rotation axis, and the third rotation axis cross at a first spherical surface link center point, a second center axis, which is a center axis of the distal end link hub, the second rotation axis, and the fourth rotation axis cross at a second spherical surface link center point, each of the plurality of intermediate link hubs is connected to the intermediate link member of each of the plurality of links, and the plurality of intermediate link hubs are coupled to one another to be rotatable about a fifth rotation axis that passes the first spherical surface link center point and the second spherical surface link center point, and the origin positioning method further comprises:

disabling, with the origin positioning member, two or more of the plurality of intermediate link hubs to mutually rotate about the fifth rotation axis when the distal end link hub is present in an origin position;

applying, with the driving source, preload on each of the plurality of links; and in a state in which the preload is applied on the plurality of links, outputting or recording at least any one of a position of each of the plurality of links, torque applied to each of the plurality of links from the driving source, and an operation amount of the driving source.

* * * * *